(12) United States Patent
Fulbrook

(10) Patent No.: US 10,694,846 B2
(45) Date of Patent: Jun. 30, 2020

(54) BEDDING RACK MULTIFUNCTIONAL APPARATUS

(71) Applicant: Jim E Fulbrook, Fairfax, VA (US)

(72) Inventor: Jim E Fulbrook, Fairfax, VA (US)

( * ) Notice: Subject to any disclaimer, the term of this patent is extended or adjusted under 35 U.S.C. 154(b) by 0 days.

(21) Appl. No.: 15/932,776

(22) Filed: Apr. 25, 2018

(65) Prior Publication Data

US 2019/0328135 A1 Oct. 31, 2019

(51) Int. Cl.
| | |
|---|---|
| A47B 81/00 | (2006.01) |
| F16B 11/00 | (2006.01) |
| F16B 12/24 | (2006.01) |
| A47B 47/02 | (2006.01) |
| A47B 47/04 | (2006.01) |
| A47B 57/06 | (2006.01) |
| F16B 12/10 | (2006.01) |

(52) U.S. Cl.
CPC .......... *A47B 81/00* (2013.01); *A47B 47/021* (2013.01); *A47B 47/04* (2013.01); *A47B 57/06* (2013.01); *F16B 11/006* (2013.01); *F16B 12/24* (2013.01); *F16B 2012/103* (2013.01)

(58) Field of Classification Search
CPC ....... A47B 81/00; A47B 47/021; A47B 47/04; A47B 57/06; F16B 11/006; F16B 11/24; F16B 2012/103; F16B 12/24
USPC ......................................... 211/206; D6/675.5
See application file for complete search history.

(56) References Cited

U.S. PATENT DOCUMENTS

| | | | | |
|---|---|---|---|---|
| 430,340 | A * | 6/1890 | Eyles | A47F 7/24 211/206 |
| 1,299,677 | A * | 4/1919 | Carroll | B21C 47/26 242/538 |
| 1,710,514 | A * | 4/1929 | Reichert | A47B 47/022 248/188.1 |
| 1,769,344 | A * | 7/1930 | Hoffmire | A43D 117/00 211/34 |

(Continued)

*Primary Examiner* — Patrick D Hawn

(57) ABSTRACT

The invention provides a unique and multifunctional Bedding Rack design in wood and metal materials for the storage and display of King- and Queen-Size Comforter Sets composed of bedspreads such as quilts, comforters, and duvets and a plurality of pillows and shams, and other bedding and sleep-related items. The Bedding Rack consists of two decorative vertical stanchions with hooks for hanging sleep apparel, one or two top rails for supporting the bedspread, two mid-level shelves composed of rails and cross bars for storing pillows and shams, a preformed lower level shelf for storing slippers and items too small for the mid-level shelves, and extended feet supporting the stanchions to provide stability. The dimensions of the Bedding Rack are such that large-size bedspreads do not touch the floor or droop off the end of the top rails when draped over it. The wood and metal Bedding Racks are manufactured as either fully and permanently assembled embodiments or the racks can be produced and shipped in a compact container for assembly by the seller or buyer where no special tools are required. The wood racks employ numerous types of tight fitted, self-locking carpentry joints to allow for assembly and the metal racks employ COTS fasteners to assemble the apparatus. A plurality of unique methods and means are described here for connecting components together and for setting the lower shelf in place so that it can be removed or set at different heights.

12 Claims, 13 Drawing Sheets

(56) References Cited

U.S. PATENT DOCUMENTS

| | | | |
|---|---|---|---|
| 2,058,184 A * | 10/1936 | Sherrard | G10G 5/00 |
| | | | 211/85.6 |
| 2,066,478 A * | 1/1937 | Lewin, Jr. | A47F 5/10 |
| | | | 211/206 |
| 2,438,324 A * | 3/1948 | Pfeffer | D06F 57/06 |
| | | | 211/206 |
| 3,847,458 A | 11/1974 | Nowak | |
| 4,308,964 A * | 1/1982 | Keller | A47B 47/04 |
| | | | 211/133.6 |
| 4,403,886 A * | 9/1983 | Haeusler | F16B 12/125 |
| | | | 211/182 |
| 4,768,656 A * | 9/1988 | Hartley | A47B 81/00 |
| | | | 211/184 |
| D316,342 S | 4/1991 | Kee | |
| D317,686 S | 6/1991 | Kee | |
| D320,897 S | 10/1991 | Yau Kee | |
| D424,320 S | 5/2000 | Klein et al. | |
| 6,151,816 A * | 11/2000 | Bagley | D05C 1/02 |
| | | | 38/102.21 |
| 6,152,313 A * | 11/2000 | Klein | A47G 25/06 |
| | | | 211/113 |
| D436,777 S | 1/2001 | Walker | |
| 6,308,837 B1 | 10/2001 | Bragg et al. | |
| D450,947 S | 11/2001 | Walker | |
| D472,731 S | 4/2003 | Harwanko | |
| 7,104,412 B2 * | 9/2006 | Yong | D06F 57/06 |
| | | | 211/206 |
| 7,249,680 B2 * | 7/2007 | Wang | A47B 57/04 |
| | | | 211/150 |
| 7,392,911 B2 | 7/2008 | Stitchick et al. | |
| 7,500,574 B1 | 3/2009 | Miller, III et al. | |
| D631,682 S * | 2/2011 | Western | D6/548 |
| 8,167,148 B2 * | 5/2012 | Jacobson | A47B 81/00 |
| | | | 108/193 |
| 8,944,260 B2 | 2/2015 | Hawkins | |
| 9,125,503 B2 | 9/2015 | Hawkins | |
| 2004/0129661 A1 * | 7/2004 | Segall | A47G 25/0664 |
| | | | 211/206 |
| 2009/0184074 A1 * | 7/2009 | Jacobson | A47B 81/00 |
| | | | 211/85.6 |
| 2010/0192428 A1 | 8/2010 | Gosney | |

\* cited by examiner

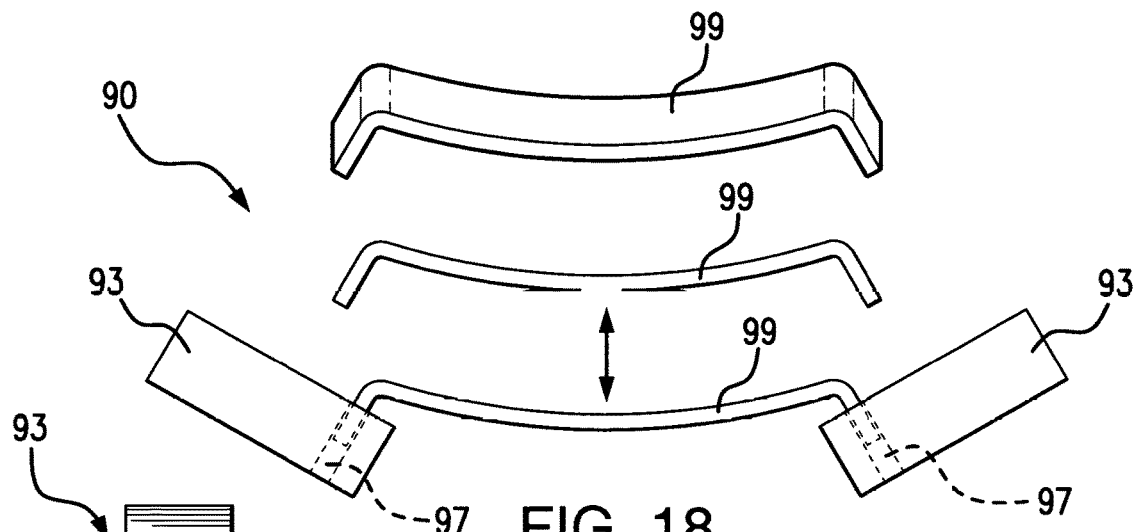
FIG. 18
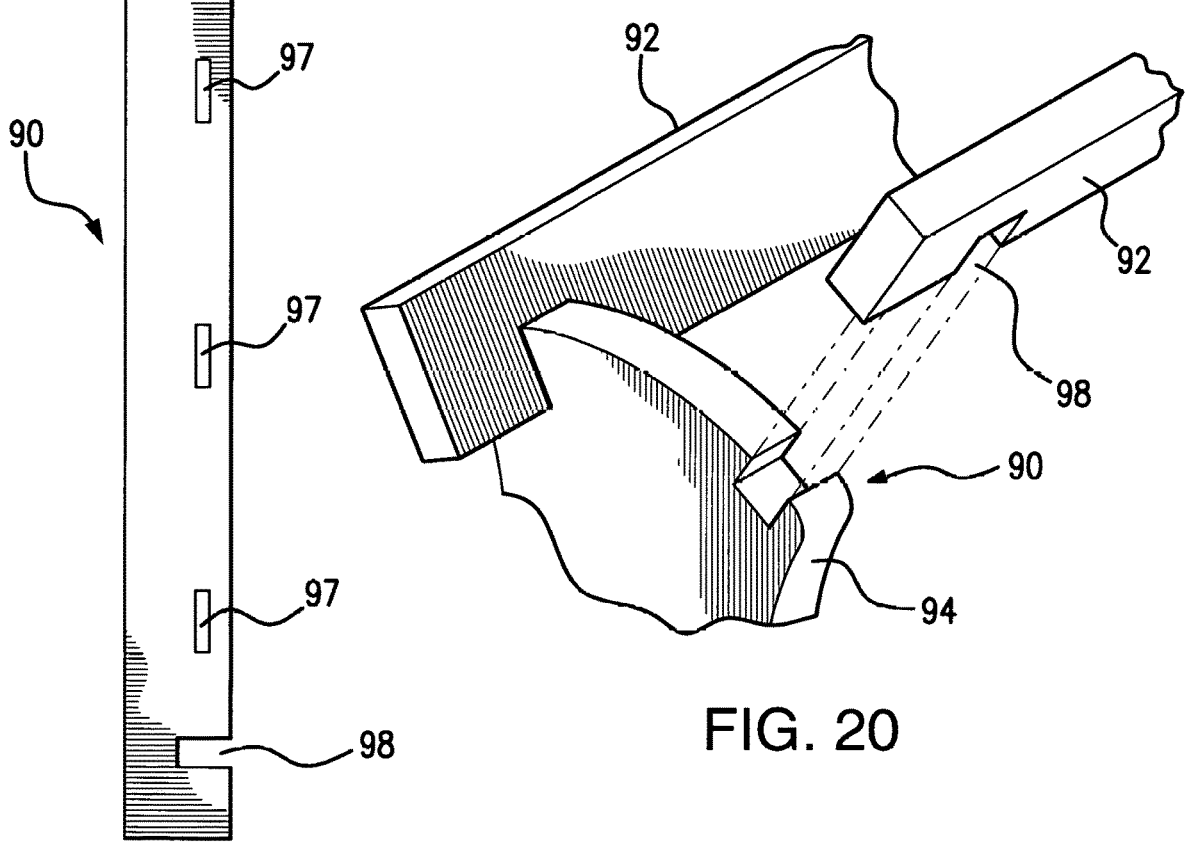
FIG. 19
FIG. 20

BEDDING RACK MULTIFUNCTIONAL APPARATUS

CROSS-REFERENCE TO RELATED TOPICS

The Applicants note that the instant invention has the benefit of an existing Provisional Patent Application No. 62/389,697—filed by the Applicants on Mar. 7 2016, and 62/602,564—filed by Applicant on Apr. 28 2017, that are incorporated in its entirety.

STATEMENT REGARDING FEDERALLY SPONSORED RESEARCH OR DEVELOPMENT

Not applicable.

REFERENCE TO SEQUENCE LISTING IN A TABLE, OR A COMPUTER PROGRAM LISTING COMPACT DISK APPENDIX

Not Applicable

BACKGROUND OF THE INVENTION

The present novel invention generally relates to an apparatus for the storage and display of bedding (comforter sets) such as quilts, bedspreads, duvets, pillows and shams for queen- and king-sized beds. The apparatus comes in the form of high-quality wood decorative furniture, and in the alternative form of a metallic framework with high-quality paint spray in multiple color finishes and textures. While the wood forms may vary in material and style from the metal variants of this apparatus, both material variants are identical in their multi-functional features.

Many U.S. households have king- and queen-sized beds with comforter sets, a type of decorative bedding used primarily when the bed is made during the day. A typical comforter set consists of a bedspread, four to seven pillows and shams that vary in size, and smaller accent or throw pillows. In addition, people often place stuffed toys and various other items on the bed for decoration. A comforter set includes a bedspread (general term) that varies based on the materials and type of stitching. This bedspread is commonly called a comforter, quilt or duvet. Since comforter sets are meant to be more decorative than functional, users typically remove the bedspread, pillows and shams and then pile these items on the floor, on top of a piece of furniture, or on the mattress at the foot of the bed. This creates a disorganized appearance. When the set ends up on the floor, it can create a tripping hazard and collects dirt more quickly. It also attracts household pets that could dirty and damage the comforter set.

The apparatus in this application shall be called a Bedding Rack, as it serves to store, organize and display comforter sets and other bedding in an efficient manner when the bed is in use at nighttime. During the day, when the comforter set is placed on the bed, the Bedding Rack provides convenient storage for pillows used for sleeping, extra blankets, slippers, sleep apparel, and other sleep-related items. Hence, the Bedding Rack is a multi-functional, decorative furniture apparatus that enhances the décor in a bedroom and provides an efficient way to store and display bedding when it is not on a bed.

While a Bedding Rack may have innumerable variations in design, the apparatus has four basic forms that are described in this document. Three are made of wood and one is made of metal. Each Bedding Rack has the same components. These include two vertical stanchions (with one on each side); one or two top rails to support the bedspread, comforter, quilt or duvet; two sets of mid-level rails for storing pillows and shams (usually with cross bars for support); and a preformed lower shelf to store slippers, small stuffed toys and other bedding materials. Each stanchion has a lengthy foot attached for stability. In addition, the vertical stanchions have side hooks to hang sleep apparel. Finally, the apparatus allows for the attachment of casters for easy mobility when desired.

A unique feature is the use of specially designed joints for two of the Bedding Rack's wooden embodiments. These joints allow for easy, on-site assembly rather than delivery of a permanently glued, finished product (unless preferred by the buyer). Since glue is not required for most of the Bedding Rack's self-locking assembly, the manufacturer can ship a Bedding Rack disassembled in a compact, smaller box and the user/seller has options for assembly with or without gluing the rack together. The metal Bedding Rack can be either welded or soldered, or COTS fasteners such as nuts and bolts can be used to connect the rails and lower shelf to the stanchions to produce a design that can be assembled and disassembled. Optional assembly is an advantage for manufacturers, as it allows for the use of a shipping container that is smaller than one used for a permanently assembled version. It also provides flexibility for display by the user. While the metal Bedding Rack and wooden Bedding Racks may appear different and do vary in materials, they are identical in overall features and functions; hence, they are necessarily included in the claims as independent embodiments of a single utility apparatus in this application.

DESCRIPTION OF THE RELATED PRIOR ART

Existing prior art examples, as disclosed in Independent Disclosure Form attached hereto, include U.S. Pat. No. 3,847,458—Nowak, U.S. Pat. No. 6,308,837—Bragg et al, U.S. Pat. No. 7,392,911—Stitchick et al, U.S. Pat. No. 7,500,574—Miller III et al, U.S. Pat. No. 8,944,260—Hawkins, U.S. Pat. No. 9,125,503—Hawkins, U.S. 2007/0289185—Huston, U.S. 2010/0192428—Gosney, and several U.S. Design Patents including U.S. Des 316,193—Kee, U.S. Des 316,342—Kee, U.S. Des 317,686—Kee, U.S. Des 320,897—Yau Kee, U.S. Des 424,320—Klein et al, U.S. Des 436,777—Walker, U.S. Des 450,947—Walker, and U.S. Des 472,731—Harwanko. These prior aft references are provided with specific reference citations in IDS Form PTO/SB/08a attached herewith in Appendix A as the basis of a Petition Filing Form SB/28 for a Petition Filing for Accelerated Examination of a New Application as support for an AESD (Accelerated Examination Support Document) in accordance with 37 CFR 1.98.

U.S. Pat. No. 3,847,458—Nowak, this invention only discloses a storage unit with an enclosed below cabinet with a closed bottom.

U.S. Pat. No. 6,308,837—Bragg et al, this invention discloses a rack for storing pillows only.

U.S. Pat. No. 7,500,574—Stitchick et al, this invention provides an adjustable shelf mounting system only.

U.S. Pat. No. 7,500,574—Miller III et al, this invention is limited to providing a collapsible racking system.

U.S. Pat. No. 8,944,260—Hawkins, this invention is limited to a fixture with free-standing display features.

U.S. Pat. No. 9,125,503—Hawkins, this invention discloses only a display storage fixture.

US 2007/0289185—Huston, this invention discloses a quilt rack used in combination with a quilt display system.

US 2010/0192428—Gosney, this invention discloses a quilting stand with limited dimensions for creating or weaving and supporting quilts.

The aforementioned prior art devices such as those disclosed above are adequate for the basic purposes as in the instant invention and are uniformly deficient with their capability to provide comprehensive, simple, efficient, and practical rack or shelf to support a comforter set comprising a large bedspread such as quilt, comforter, or duvet associated with King- and Queen-Size beds and all lack the additional features for storing pillows, slippers and other bedroom paraphernalia in a single multi-functional decorative furniture apparatus.

To address the particular limitations in the prior art, the instant invention provides a novel arrangement in the form of a minimal design and high quality wood apparatus or alternatively a highly functional metallic apparatus for providing the same multiple functions such as: a) storage and display of a large-size bedspread such as a quilt, comforter, or duvet; b) a sturdy and adaptable means for storing and displaying shams and various pillows within storage shelves integral to the Bedding Rack; c) a dedicated lower shelf space for storing bedroom slippers, or other sundry bedroom paraphernalia; and d) a number of attaching pieces or hooks for hanging sleep apparel or other sundry items. In addition, attachable wheels or casters may be added for mobility of the rack.

Therefore a comprehensive, functional and decorative apparatus is described here that provides a method or means to overcome the limitations in the existing prior art examples provided herein for the efficient and adaptable storage and display of large bed sized comforter sets comprising bedspreads such as quilts, comforters, or duvets and that include pillows and shams in a decorative and highly functional rack or stand. A key discriminator of the Bedding Rack is that both wood and metal variants can be manufactured so that the apparatus can be assembled with or without gluing for the wood variants or assembled by nuts to bolts between connected components by the seller or owner/user. The assembled unglued Bedding Rack has two further unique advantages in that the cross bars used for the pillow and sham shelves can be slid along the rails as desired and the lower shelf is simply set in place so that it can be removed for cleaning underneath when desired. In that regard, both a permanently assembled, glued wood Bedding Rack and a welded metallic construction Bedding Rack are described as well. In effect, the whole of the apparatus is greater than the sum of its parts given its manifold features and functions, especially relative to other related products.

Aside from the prior art, a comprehensive review of commercial products on the market was conducted. There are innumerable quilt racks and innumerable products called shelves but there are no products specifically identified as a 'Bedding Rack'. The term was not found applicable to a product in numerous searches on search engines. The URL for Bedding Rack was available, and this domain is now owned by the inventors as beddingrack.com. Websites such as Amazon, eBay, and another by Hayneedle with a website called quiltracks.com offer numerous devices for storing quilts, or decorative bedspreads, but none have the multi-functional and dimensional characteristics of the Bedding Rack described herein. Most of these products are simply too small dimensionally to display a King- or Queen-Sized Comforter Set effectively. None have the multi-functional features or comparable design elements of the Bedding Rack, especially the unique joints used in the wood racks that allow for assembly of a rack from a compacted shipping box relative to the large shipping box that a permanently assembled Bedding Rack would require.

BRIEF SUMMARY OF THE INVENTION

This instant novel invention provides for the storage and display of Comforter Sets that include bedspreads such as quilts, duvets, or comforters for King- and Queen-Size beds. Many large-size bedspreads have industry standard dimensions of about 110 inches by 96 inches. When this bedspread is folded once in the center on its width, it will then have dimensions of about 55 inches by 96 inches. Hence, if the Bedding Rack is constructed with dimensions that include a height of about 48 inches, a length along the top rail(s) of about 55 inches, and a rack width of about 10 inches, when the 96-inch long comforter, quilt, or duvet is draped over the top rail(s), it will have an appealing organized finish where no part of the bedding comes into contact with the floor and the bedspread will not droop off the top rail ends. The stanchions can be placed the full 55 inches apart, although when the space between the two vertical stanchions varies in design from about 38 inches to 46 inches apart, the rack has a more balanced appearance. When the stanchions are closer, the top rails must have extensions outside of the stanchions on each side that equal a top rail length of about 55 inches.

Since some variation in dimensions can be used in the Bedding Rack, this achieves an effective and aesthetic display of the bedding and the rack itself as a unique decorative furniture embodiment for any bedroom décor. For instance, an alternative design has two 55-inch long top rails with a width separation of about 10 inches. This allows the stanchion height to be about 44 inches to ensure the standard 96-inch by 55-inch once folded bedspread does not touch the floor vice the single top rail design that requires about a 48-inch height. These dimensions are unique as no prior art is designed in this way, as the prior art are commonly smaller and called either a Quilt Rack or Shelf Unit. The Bedding Rack combines its multiple functional features in a decorative, balanced, appearance to achieve a more efficient and effective storage apparatus for the broadest variety of products sold as bedding or comforter sets. The dimensions cited here are optimal for King- and Queen-sized beds, but they are not restrictive to Bedding Rack designs, as long as the functional features are retained. Hence, a wood or metal Bedding Rack of larger overall dimensions could be produced as a custom product, and smaller overall dimensions could be used to produce Bedding Racks that accommodate Full-Size and Double Bed Comforter Sets where each variant appears similar to the Bedding Racks described here and each will have identical manifold functional features described herein.

In addition, a further feature of the instant invention includes a plurality of attachment points on the outside of the vertical stanchions of the rack apparatus that provide a means for hanging sleep apparel and other bedroom accoutrements.

Finally, the instant invention specifically provides for added mobility of the Bedding Rack apparatus by inclusion of casters or rollers to provide for easy mobility of the rack/support apparatus when desired by the user.

The essence of the instant invention is to meet the basic requirements disclosed in the following:

1. The fundamental purpose of the invention is to fill the need for a highly functional rack/stand for storage and display of a King- or Queen-Size Comforter Set that includes a bedspread such as a quilt, comforter, or duvet with a variety of pillows and shams.

2. The invention provides for at least two material types of Bedding Racks in the form of wood or metallic constructions. In addition, the wood apparatus has three types of designs where there is a variation in the top rail(s) and the pillow and sham rails with or without cross bars. The wood designs include unique carpentry joints that allow for assembly of the apparatus and the metal variants can also be produced as assembly racks by using nuts that screw into bolts fastened inside the rails. Both material variants can also be produced as permanently assembled racks as well by gluing for the wood variants or welding or soldering for the metal variants. As stated, regardless of material or option for assembly, the Bedding Racks have identical multi-functional features and capabilities.

3. In addition, the wood embodiments have options for how the lower shelf is placed above or on the feet of the vertical stanchions so that it can be secured in place but also readily lifted off. Designs are also described and depicted herein where the lower shelf can be placed at one of two heights above the floor based on user preference or where brass hangers are used that allow the shelf to rotate or swing from side-to-side when bumped or pushed so that the shelf remains level where items do not fall off. Note that the lower shelf in all wood and metal variants will be permanently assembled when manufactured so that in all instances the long rungs and shorter orthogonal rungs comprising the lower shelf will be viewed as a single item or component of a Bedding Rack.

4. The invention meets the need for storing and displaying a King- or Queen-Size Comforter Set comprising a bedspread such as a quilt, comforter, or duvet by specifically sizing the Bedding Rack to readily accommodate such large-scale items. Minimum dimensions in height, length, and width are required to achieve the best display of the bedding, which are described in this application. The intent is that when the comforter set bedspread, pillows, and shams are stored on the Bedding Rack, the bedspread will not touch the floor or droop off the ends of the top rails. The other bedding materials stored under the bedspread and on the shelves will also be organized and out-of-sight where the bedspread also lays flat when properly draped over the rack.

5. The invention also provides integral storage and display of a plurality of pillows, shams, and smaller accent pillows on two mid-level shelves when not placed on the made bed, which is when the bed is intended for sleeping or other purposes.

6. Further, the invention provides a third lower shelf for accommodating bedroom slippers, stuffed animals, and other bedroom paraphernalia too small for the mid-level shelves when the bed is in use.

7. In still a further feature of the instant invention, there are a plurality of attachment points on the ends of the Bedding Rack that provide a means for hanging clothing and other bedroom accoutrements.

8. Still further, the invention can incorporate casters or rollers to provide for an easy means of movement of the rack/support apparatus.

9. The unique use of wood joints allows those wooden Bedding Racks so constructed to be assembled by the seller or buyer rather than the rack being permanently glued or fastened together when sold in the other case. This is an important shipping and selling feature. The wooden joints add to the overall appearance and innovative design of the Bedding Rack without sacrificing its stability when in use. In that regard, the metal Bedding Rack could also be either welded or fasteners (nuts, bolts, screws, etc.) could be used so that this design also has permanently assembled and seller/buyer assembly options.

10. Note that the Bedding Rack is intended to store decorative comforter sets and other items from the bed when it is prepared for sleeping or other uses. However, during times when the comforter set is displayed on the made bed, the Bedding Rack also serves as an effective organizer, storage, and display apparatus for sleep apparel, slippers, extra bedding, and any other sleep-related items desired by the user. These items can be placed across the top rails, on the mid-level shelves, on the lower shelf, and on the hooks provided on the outside of the vertical rack stanchions.

11. Finally, the Bedding Rack has manifold practicable uses in a bedroom aside from its use as an innovative furniture piece that enhances and complements the décor of the room by its appearance and utility. The Bedding Rack saves space by its unique dimensions, it keeps comforter sets from being placed on the floor or elsewhere where they would appear out-of-place, it preserves the comforter set by keeping it cleaner when organized on the rack, it keeps the comforter set away from pets who could soil or damage the set items, and it provides greater safety when the comforter set items are not on the floor where they would be tripping hazards.

The various disclosed embodiments of the instant invention demonstrate the following significant user advantages over existing prior art:

There are no existing prior art apparatuses that disclose the means to support and display King- and Queen-Size Comforter Set bedding comprising a bedspread such as a comforter, quilt, or duvet along with its pillows and shams in a comprehensive, multi-functional, and completely self-supporting form of decorative furniture.

There are no prior art examples that can ensure that the storage and display of Comforter Sets for King- and Queen-Size beds do not result in items being in contact with the floor or droop off the ends of an apparatus that would distract from its organized appearance.

In the prior art search, it is evident that there are no examples of racks, supports, or shelves designed or capable for accommodating storage and display of pillows, shams and smaller accent pillows when they are not in place on the made bed.

Further, prior art examples of racks, shelves, and other support devices do not specifically provide for storage of bedroom slippers and other bedroom paraphernalia when not in use. This includes daytime when items used for sleeping can be stored, and at nighttime or times when the bed has the comforter set removed for whatever purpose.

In still a further feature of the instant invention, there are a plurality of attachment points on the outside of the vertical stanchions of the Bedding Rack that provide a means for hanging clothing such as pajamas and other bedroom accoutrements.

Still further, existing prior art does not provide for easy mobility of racks/supports by means of casters or rollers.

In addition, no prior art employs the use of specific wood joints that allow the Bedding Rack apparatus to be sold as unassembled or assembled and that provide a sufficiently stable embodiment that does not require gluing or permanent fixtures and fasteners. The assembly variants and the permanently assembled variants of the wood and metal Bedding Racks provide a full range of options for sellers and consumers.

The inventive concepts herein for the Bedding Rack include numerous carpentry joints to achieve stability for the apparatus. The combination of these as depicted in the Figures and described in detail later in this document yield options for how the top rails are designed, how the two mid-level pillow and sham rails are designed, how the lower shelf is designed, and how the decorative vertical stanchions can be designed without altering the functional features of the Bedding Hack.

The lower shelf in the Bedding Rack is unique in that there are three methods or means described that allow the shelf to rest in its position where no structural support is provide by this shelf. Hence, the shelf can be lifted as desired or rotated when brass hangers are used to clean under the shelf or raise and lower it to a different height.

The wood Bedding Racks have decorative vertical stanchions that can be enhanced by cutouts, veneers, inset panels, appliques, carvings and other designs. The wood can be hardwoods such as cherry, walnut, mahogany, oak, and teak, but also softwoods such as pine and maple. The designs can be built to match and complement the rack with other recognized furniture designs such as Victorian, Queen Anne, Empire, Baroque, Federal, Stickley, Mission, Shaker, Art Deco, Depression era, and any number of other furniture lines and styles sold by furniture manufacturers or as antiques. Other components of the Bedding Rack construction such as the rails, feet, and lower shelf can be customized as well without altering the functional features of the apparatus. This also applies to the metal Bedding Racks that can be designed to complement furniture styles as well, but also have the advantage of being paintable, plateable, or easily powder coated with a wide variety of colors and textures. The metal can be a wide variety to include wrought iron, aluminum, and a range of steel from hardened or annealed to spring/flexible materials.

Finally, the numerous variations in Bedding Rack designs that provide identical functional features also offer more style choices and price points for consumers that will better match the bedroom décor where a Bedding Rack is used. A high quality decorative furniture embodiment is a requirement for its marketability along with its multi-functional features.

BRIEF DESCRIPTION OF THE DRAWINGS

Various features, aspects, and advantages of the present invention will become apparent with reference to the following FIGS. 1 to 23.

FIG. 18 shows an alternative design for metallic cross bars that attach to the pillow and sham shelf rails in the Bedding Rack design shown in FIG. 16.

FIG. 19 shows a detail of a pillow and sham rail used in the alternative wooden embodiment shown in FIGS. 16 & 17 where the metallic cross bar is used as shown in FIG. 18.

FIG. 20 shows a detail of carpentry (wood) Lap Joint used to attach the two top rails and four mid-level pillow and sham rails to the stanchions in the Bedding Rack shown in FIGS. 16 & 17.

Figure 1:
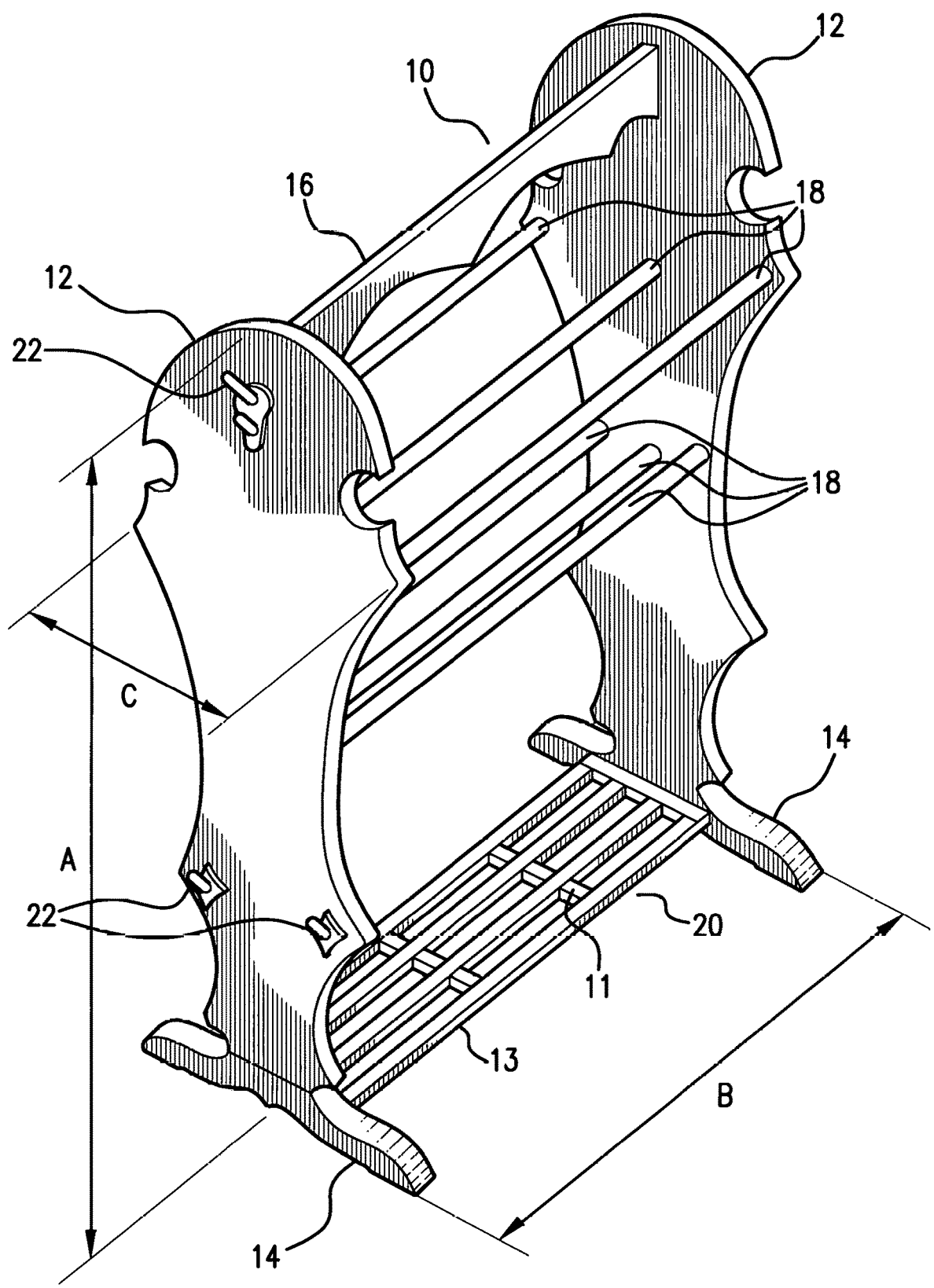
FIG. 1 shows the first of three wood design embodiments of the Bedding Rack. The principal components include two decoratively designed vertical stanchions with attaching points/hooks, a top rail and a plurality of horizontal load bearing members called shelf rails, two stabilizing feet members, and a lower level storage and display shelf. This rack design requires gluing for permanent assembly.

DESCRIPTIONS OF THE FIGURES WITH REFERENCE NUMBERS FOR THE ELEMENTS IN THE DRAWINGS

The first of three inventive concept designs in the wood apparatus 10 as shown in FIG. 1 with controlling Dimensions A (height), B (length), and C (width). These dimensions are about: A=48 inches, B=55 inches, and C=10 inches. When a standard large-sized bedspread such as a comforter, duvet, or quilt of about 110×96 inches is folded once to yield a dimension of about 96×55 inches, the bedspread will not touch the floor or droop on the ends when evenly draped over a Bedding Rack built to the above dimensions. These dimensions can change with design variations of the Bedding Rack, but the design dimensions must remain sufficient to effectively store and display King- and Queen-sized Comforter Sets as described above.

Decorative vertical load-bearing stanchion end pieces 12 for apparatus are shown in FIG. 1. Attaching Points on the outside of the stanchions 12 in the form of wooden hooks or pegs 22 for attaching sundry bedroom accoutrements such as sleep apparel are shown in FIG. 1.

Stabilizing feet 14 for the apparatus are shown in FIG. 1. Each extended foot 14 attaches to the stanchion 12 by three rectangular carpentry mortise and tenon joints (not depicted). The feet 14 extend out from the Bedding Rack a sufficient length to add stability and deter the rack from tipping over. The foot is also wider than the stanchion so that an edge is created on each side of the stanchion on the top of the foot.

A single horizontal load-bearing top rail 16 is shown in FIG. 1.

Two mid-level storage shelves composed of three rails 18 for placing pillows and shams are shown in FIG. 1. Each shelf has two rails 18 parallel to each other with a middle rail 18 centered and lower relative to the parallel rails. In the other two Bedding Rack designs described here, only two parallel rails are used along with up to three cross bars per rail shelf. The cross bars support the pillows and shams and add to the decorative appearance of the apparatus.

Lower level storage shelf for slippers, etc., 20 is shown in FIG. 1. The lower shelf has long rungs 13 running along the length and orthogonal rungs 11 so that smaller items such as stuffed toys do not fall through. The shelf 20 is loosely secured by the top of the feet 14 on the stanchion 12 with either Bench Dogs 72, Dowels 80, or Brass Hangers 74 shown in later figures. The lower shelf does not provide structural support to the Bedding Rack, as it is designed to easily lift off (FIGS. 8 through 13) or rotate (see FIGS. 14 and 15) when desired by the user. Note that the lower shelf will be permanently assembled by the manufacturer as a single component, even in the variants where the rest of the Bedding Rack can be assembled.

This completes the brief descriptions of the essential functional features of the three wooden Bedding Rack embodiments described in this document. However, the first wood embodiment 10 is intended to be built by using glue to permanently attach the stanchion 12 by the top rail 16 and six pillow and sham shelf rails to achieve stability. In this instance, wood dowels in the rails 16 and 18 are inserted into the stanchions to add stability when the Bedding Rack is glued together. However, in the other two preferred wood embodiments, each will be manufactured and shipped as an unassembled furniture item in a relatively compact container. By use of several carpentry joints, the Bedding Rack can then be easily assembled by a seller or owner/user where gluing is optional. As an alternative, the inventive concept provides for connections between the horizontal rail components and the vertical end stanchions to be in the form of COTS (Commercial Off The Shelf) bolts through the end piece stanchions mating with threaded inserts in the rail components.

Figure 2:
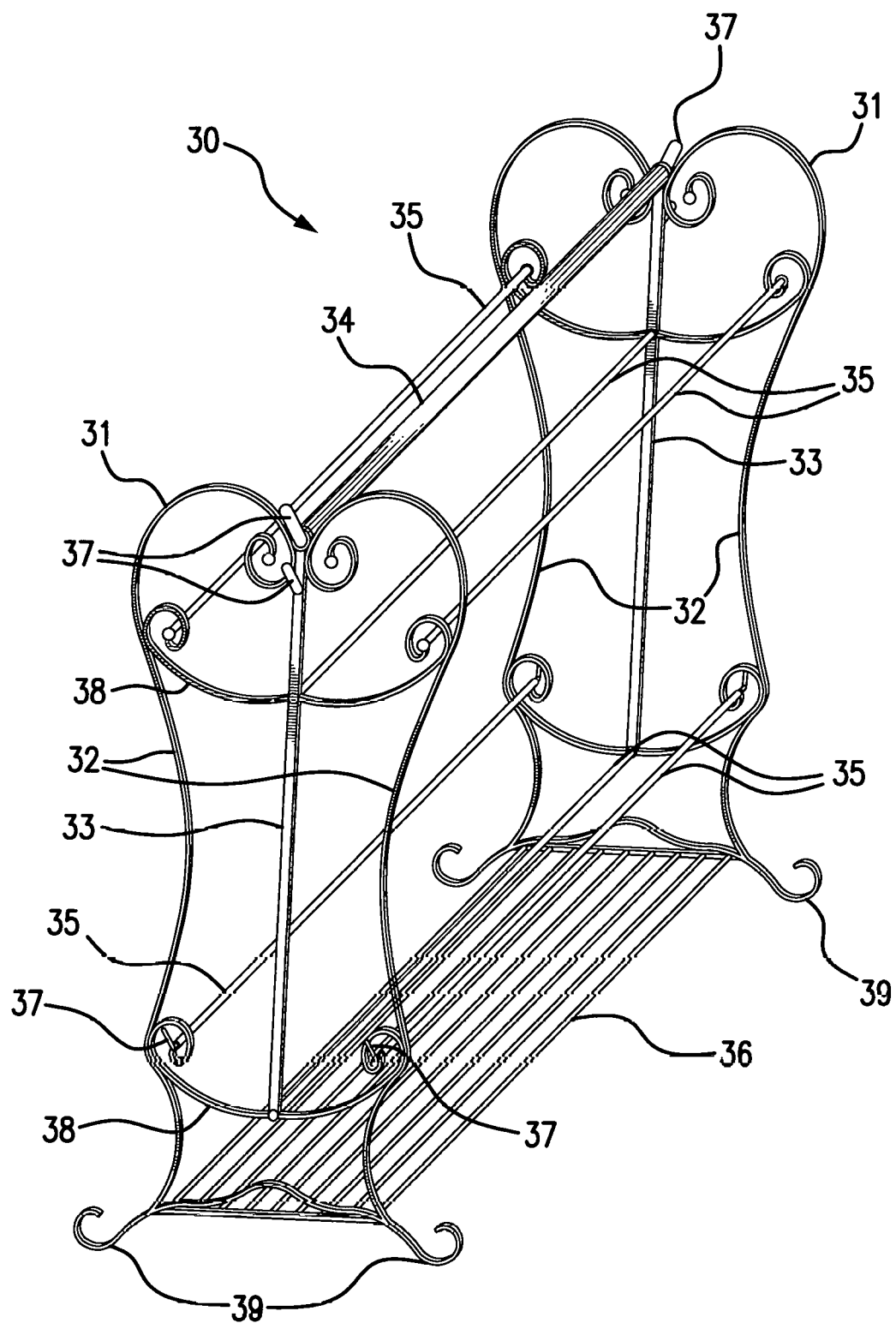
FIG. 2 shows a sample metallic design for a Bedding Rack that has the same basic functional features as the rack shown in FIG. 1 and in later Figures.

FIG. 2 discloses 30 the inventive concept in the form of a metallic construction comprising two vertical decoratively curved stanchions 31 created by welding or soldering two sets of mirror image end pieces 32 with curved inner pieces 38 to a vertical center piece 33 of the stanchion. The metallic design includes decoratively curved feet 39, a horizontal top rail 34, shelf rails 35, a base or lower shelf 36, and hooks or pegs 37 for hanging sundry bedding items such as sleep apparel. The metal Bedding Rack can be either welded or soldered, or fasteners such as nuts and bolts can be used to connect the rails and lower shelf to the stanchion to produce a design that can be assembled and disassembled. Assembly as an option is an advantage for manufacturing, for shipping where a smaller container would be used relative to shipping a permanently assembled version, and it provides flexibility for display by the user. While the metal and wooden Bedding Racks may appear different and do vary in style and materials, they are identical in overall features and functions; hence, they are necessarily included in the claims in this application as independent embodiments of a single utility apparatus. The inventive concept incorporates metallic component manufacture by the use of engineering jigs and templates.

Figure 3:
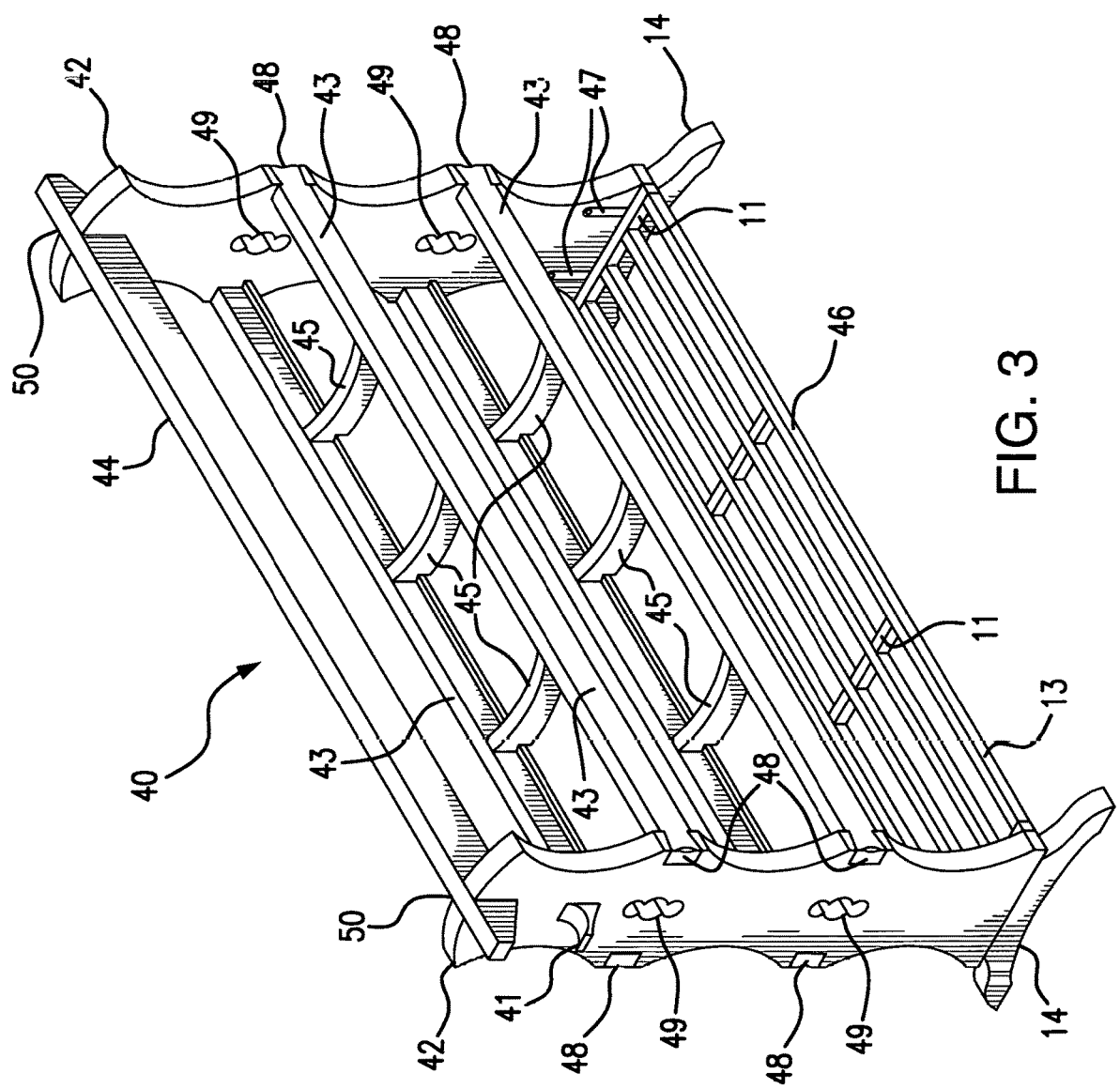
FIG. 3 shows the second of three advanced structural designs of a wooden Bedding Rack. This design includes the same components as the wooden Bedding Rack in FIG. 1 but cross bars are added that can be slid on the two rail shelves where pillows and shams are stored as shown in FIG. 7. This design includes joints that allow for assembly and disassembly of the rack with optional gluing.
Figure 8:
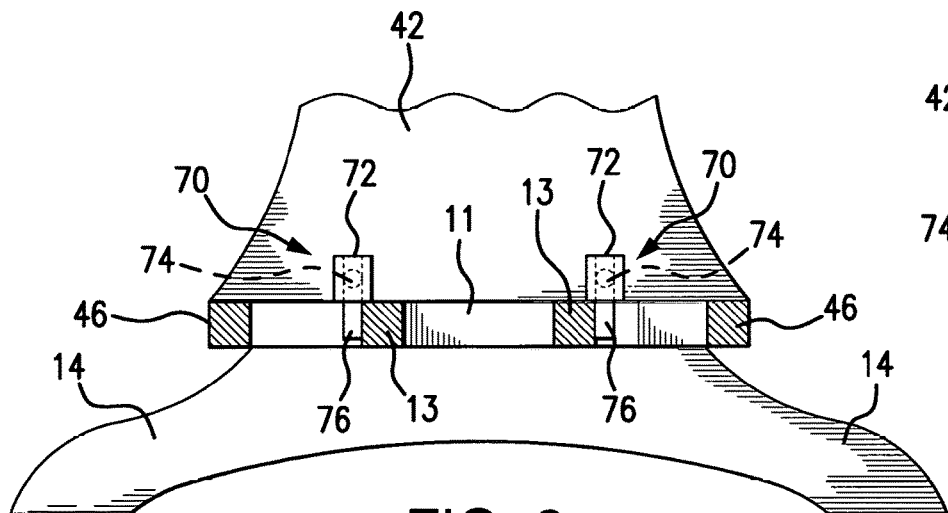
FIG. 8 shows a detail of two wood stanchion attachments using carpentry Bench Dog Joint connections that hold and support the lower shelf in place on the top of the rack foot by means of block and pin components.
Figure 12:
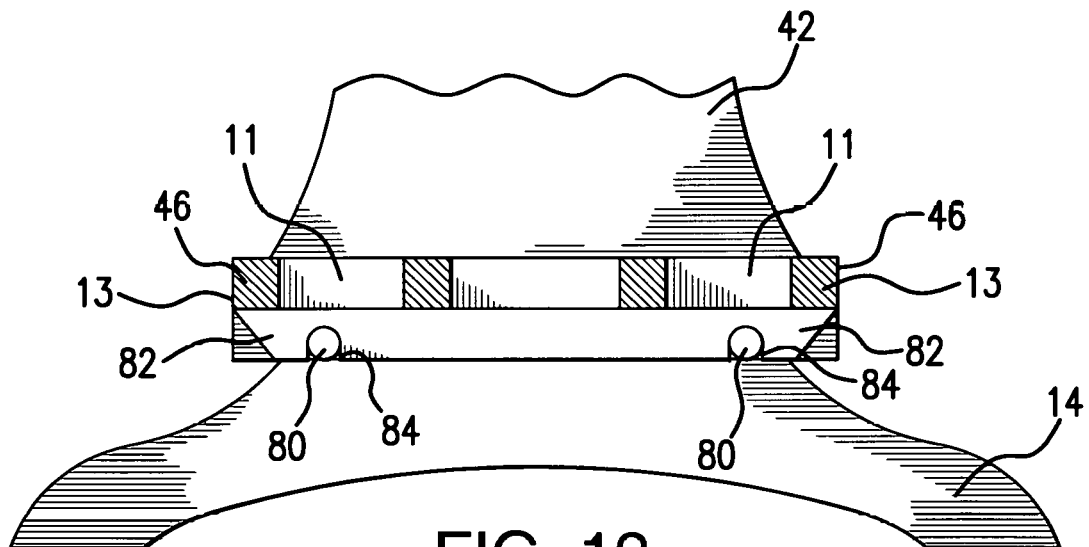
FIG. 12 shows a front view of the lower shelf being held in place by two wood dowels coming out of the stanchion that secure the shelf in place as it sits on the dowels and top of the foot.

FIG. 3 shows an advanced wood structural design 40 of a Bedding Rack, comprising end stanchions 42 with hooks 41 and stabilizing feet 14, a single top rail 44 with extensions outside of the stanchions called horns, T-bridle joints 50, a plurality of rail members 43 attached to the stanchions 42 by dovetail joints 48, a plurality of cross bars 45, a lower shelf 46 composed of a plurality of orthogonally assembled square shelf 13 and orthogonal 11 rungs comprising the length and width of the shelf 46, and a method for attaching the lower shelf 46 to the stanchion 42 using brass hangers 47 that allow the shelf to rotate or sway forward and back if bumped. The stanchion 42 has decorative cutouts 49 on each side. Other means to set the shelf loosely in place are shown in later Figures (FIGS. 8 and 12).

Figure 4:
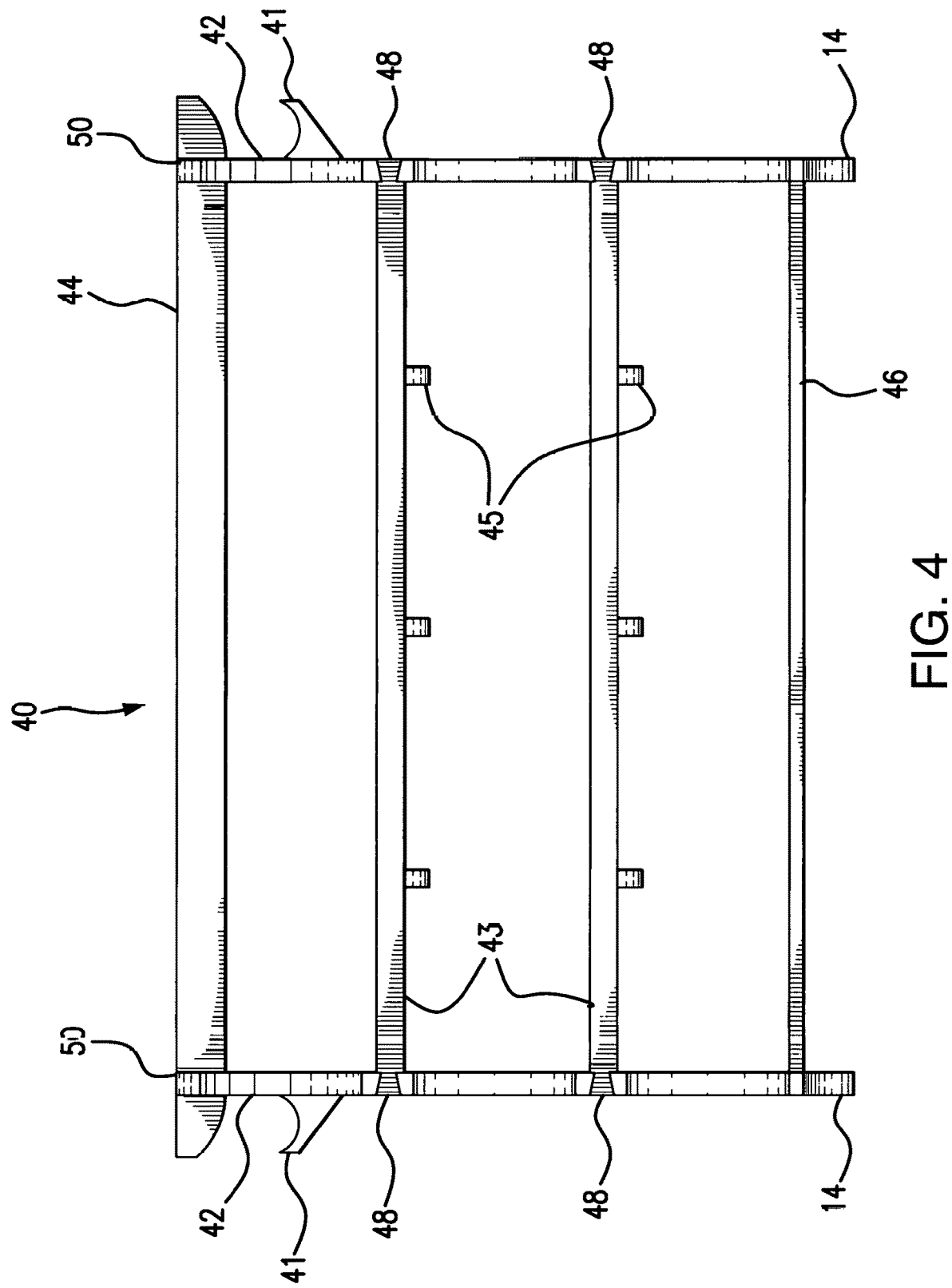
FIG. 4 shows a front view of the Bedding Rack shown in FIG. 3.

FIG. 4 shows a front elevation view of the Bedding Rack 40 shown in FIG. 3 where the stanchions 42, top rail with horn extensions 44, T-bridle joints 50, hooks 41, dovetail joints 48, pillow and sham shelf rails 43, a plurality of cross bars 45 that can be slid along the rails, feet 14, and a lower shelf 46.

Figure 5:
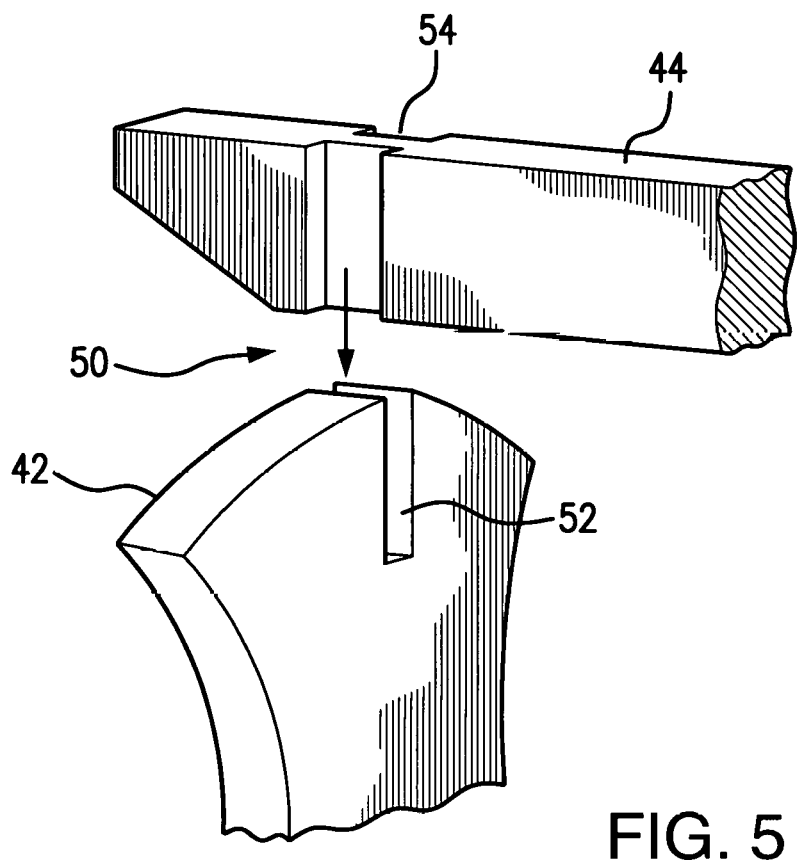
FIG. 5 shows a detail of carpentry (wood) T-Bridle Joint that is used to attach the Top Rail to the stanchion in the Bedding Rack shown in FIG. 3.

FIG. 5 shows a detail of a carpentry (wood) T-Bridle Joint 50 for the top rail 44 that has a recessed (cut-in) detail 54 that is slid into the Stanchion 42 that has a receiving slot 52 as shown in FIG. 3. Once inserted, the top of the rail and stanchion are flush with each other, tight fitted, and self-locking.

Figure 6:
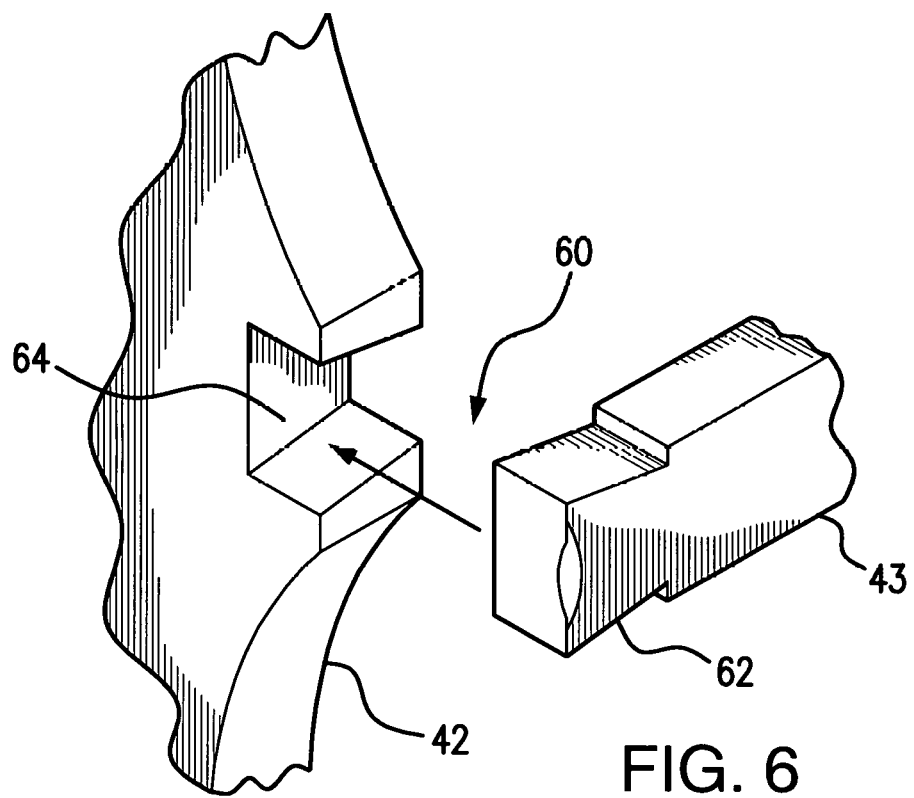
FIG. 6 shows a detail of carpentry (wood) Dovetail Joint that is used to attach each pillow and sham shelf rail to the sides of the stanchion in the Bedding Rack shown in FIG. 3.

FIG. 6 shows a detail of a carpentry (wood) Dovetail Joint 60 for attaching the rails of the two pillow and sham shelves 43 to the outside ends of the stanchions 42 as shown in FIG. 3. The male dovetail component 62 is tight fitted into the female dovetail component 64 to where the dovetail joint components are flush with each other on the outside of the Bedding Rack. The joint is self-locking and creates a unique decorative appearance.

Figure 7:
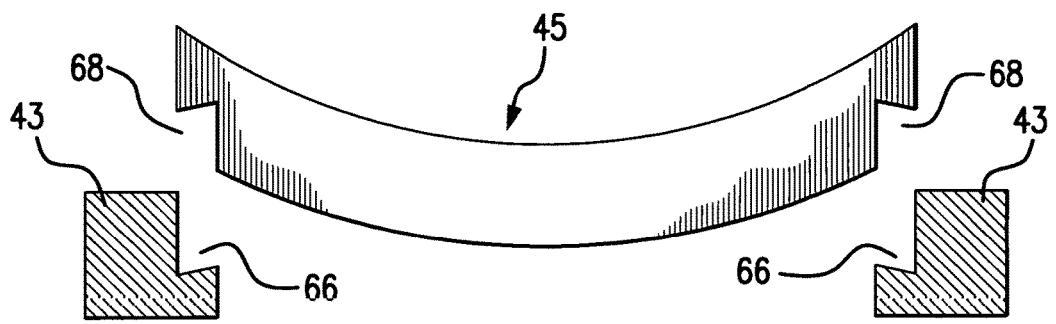
FIG. 7 shows a detail of sliding wood Cross Bar with angled support posts that fit into the angled pillow and sham shelf rail supports as shown in FIG. 3.

FIG. 7 shows a detail of a curved wood Cross Bar 45 sitting above the angled supports 66 on the shelf rails 43 as shown in FIG. 3. The angled cross bar pieces 68 are placed into the similarly angled rail slots 66 and can be slid along the rails to provide direct support to pillows or shams. The angled components 66 and 68 mesh together to secure the cross bars within the rails and provide added structural stability for keeping the rails securely in place at the dovetail joints. The wood cross bars are about one-inch in width and about 1.25 inches in height; length is determined by separation distance between rails comprising a shelf (about 9 inches when rail width is about 10 inches).

FIG. 8 shows a detail of a wood attachment method using a carpentry (wood) Bench Dog Joint 70 comprising a block detail 72, wood dowel 74, and tight fitted sliding pin 76 that goes up and down. The dowel permanently attaches the bench dog joint 70 to the stanchion 42. The lower shelf 46 is slid under the bench dog and rests on the inside top edge of the foot 14. In this method, the pin 76 is pushed down to secure the lower shelf in place by a shelf rung 13 and orthogonal outside edge rung 11. This design is only depicted here and not in any of the three wood embodiments 10, 40 and 90 shown in other Figures but it can be implemented for any wooden Bedding Rack design. The bench dog joints allow the user to select one of two shelf heights and it adds a unique functional and decorative feature to the apparatus.

Figure 9:
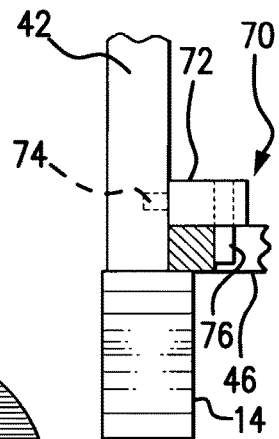
FIG. 9 shows a side view of the bench dog joint shown in FIG. 8.

FIG. 9 shows a side view of the Bench Dog connection 70 shown in FIG. 8. Note that the dowel 74 is inserted into the stanchion 42 and will be preglued when manufactured.

Figure 10:
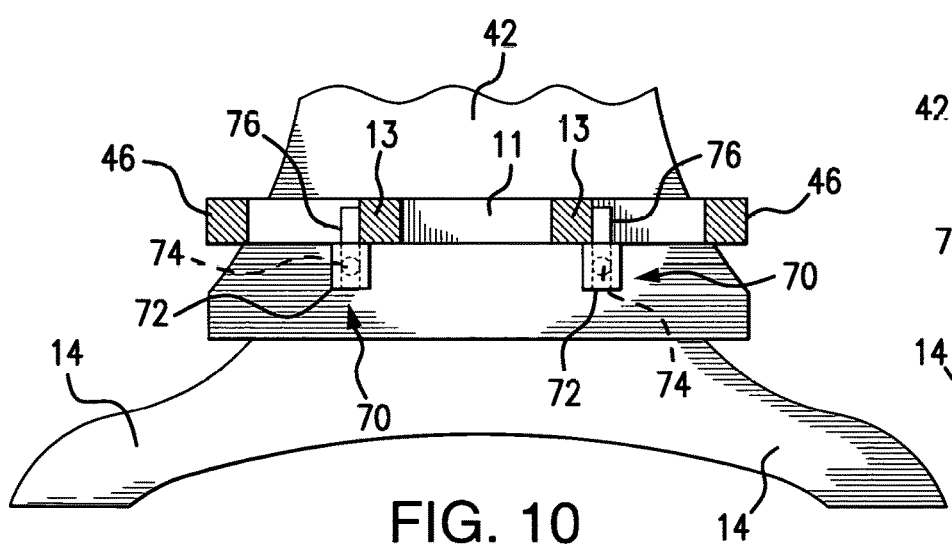
FIG. 10 shows a front view of the bench dog joint where the pins are placed upward, which allows the shelf to be held and supported when placed on top of the bench dog block.

FIG. 10 shows a front view of the Bench Dog Joint 70 relative to the lower shelf 46 and stanchion 42. In this method, the bench dog pin 76 is pushed up, which allows the shelf 46 to be pulled out from under the bench dog 70 and the top edge of the foot 14 as shown in FIG. 8. The shelf 46 then sits on top of the four permanently attached bench dog joints 70, two on each inside stanchion 42. The raised pin 76 holds the shelf 46 in place by its outside edge and rungs 11 and 13, but the shelf can be easily lifted and removed. The lower shelf provides no structural support in any wood embodiment of the Bedding Rack.

Figure 11:
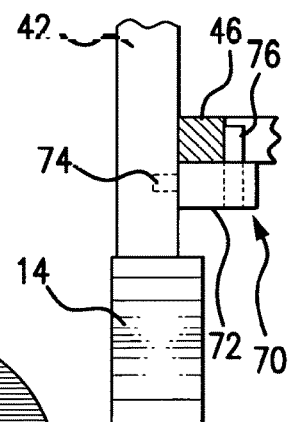
FIG. 11 shows a side view of the bench dog shown in FIG. 10 where the wood pin holds the shelf in place and supported on top of the block.

FIG. 11 shows a side view of the Bench Dog Joint 70 shown in FIG. 10. The four bench dog joints 70 now support the shelf 46, the pins 76 hold the shelf in place by being placed close to the rungs 11 and 13. The shelf 46 is now sitting in a higher position than it was as shown in FIG. 8.

FIG. 12 shows an inside side view of a wood carpentry dowel 80 for sitting the lower shelf 46 bottom piece 82 on the dowel 80 and the top edge of the foot 14. The dowel 80 is attached to the stanchion 42. In this method, the shelf bottom piece 82 incorporates the cutout piece 84, which avoids cutting into the normal shelf rungs 11 that would weaken the structure. By this method, the shelf sits in place but can be easily lifted off or put back in place by a user.

Figure 13:
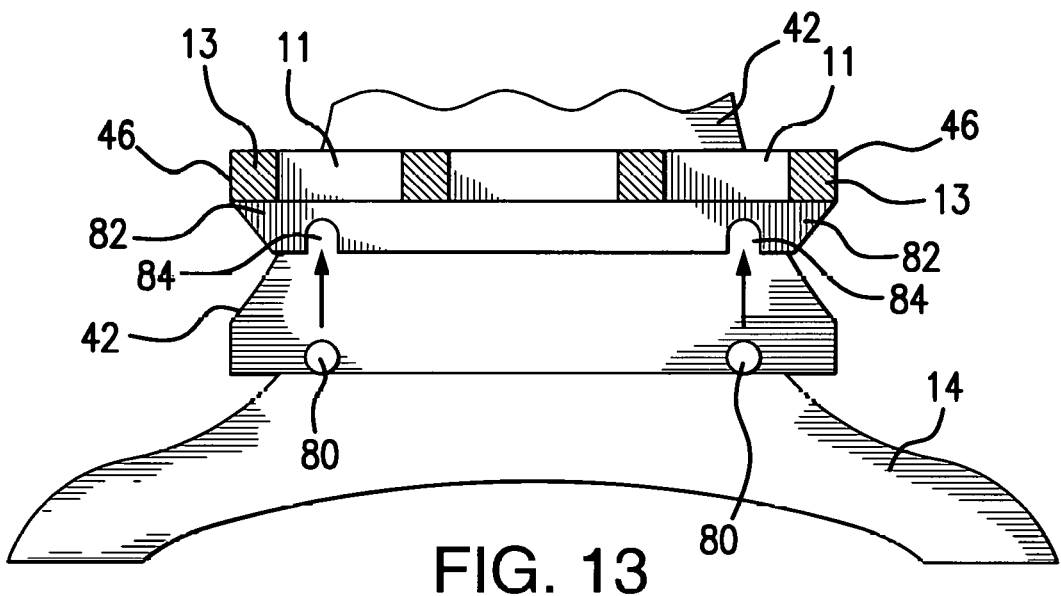
FIG. 13 shows a front view of the lower shelf lifted to remove it from the Bedding Rack as shown in FIG. 12.

FIG. 13 shows the shelf 46 with its added piece 82 raised above the dowel 80 and top edge of the foot 14 compared to the view in FIG. 12 of the sitting shelf.

Figure 14:
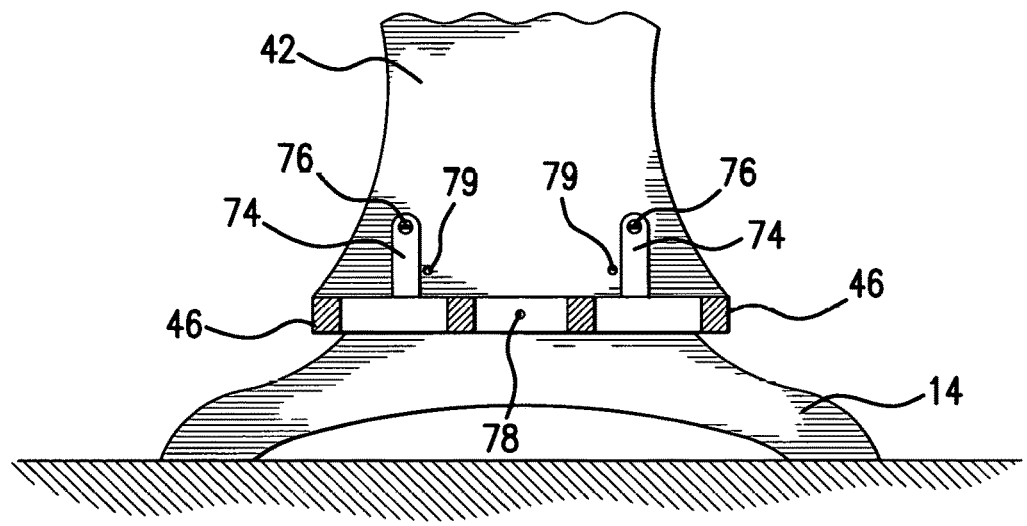
FIG. 14 shows a view of the lower shelf attached by two brass hangers that allow the shelf to rotate or sway in a forward or back direction.

FIG. 14 shows an inside side view of an alternative method for connecting the shelf 46 to the stanchion 42 by means of metallic Hangers 74 such as Brass that have a screw and washer fitting 76 and small holes 79 with retaining pins 78 that pass through the shelf and into the holes 79 on the stanchion so the shelf is held in a desired position. When the pins 78 are removed, the shelf can freely rotate or swing from the attaching points 76. In this way, when the shelf is bumped or intentionally rotated (see FIG. 15), the shelf remains horizontal to the floor, so items placed on the shelf will not fall off. Additional holes 79 can be added to retain the shelf in any number of positions and heights around a 360-degree circle if there is a hole 79 for the pin 78 to be inserted into to hold the shelf in place. Hence, the number of height options is equal to the number of pin holes.

Figure 15:
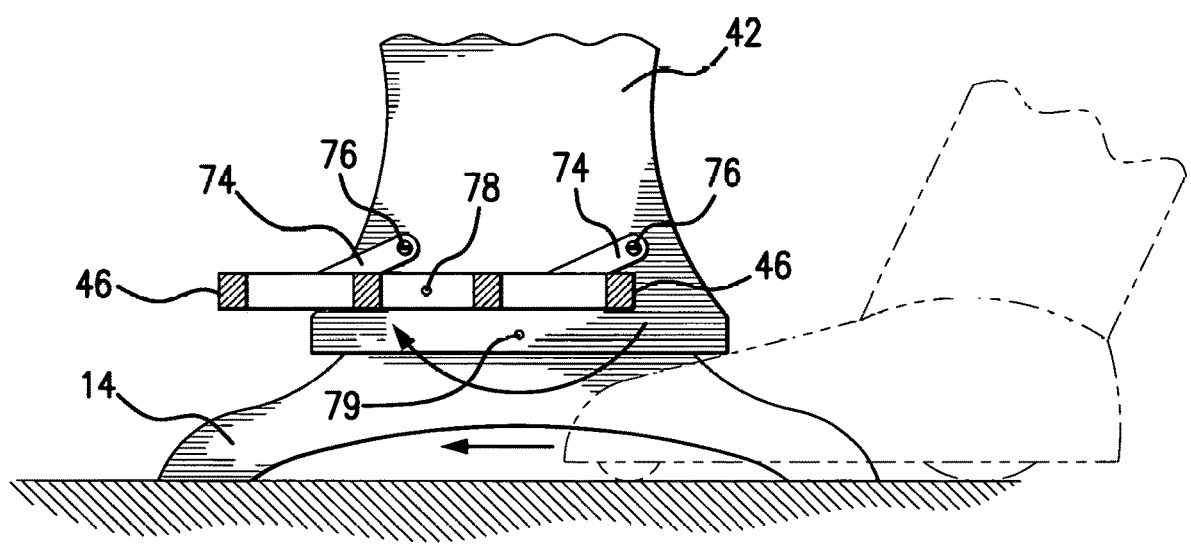
FIG. 15 shows a view of the brass hanger method for mounting the lower shelf as shown in FIG. 14. The shelf is rotated in one direction and remains horizontal as a vacuum cleaner is pushed underneath so that items placed on it will not fall off.

FIG. 15 shows an inside side view of the shelf 46 being rotated from its resting position shown in FIG. 14. In this Figure, a vacuum cleaner (dotted image) pushes under the shelf and causes it to rotate or swing upward. The shelf remains horizontal so items on the shelf will not fall off. Components labeled in the drawing include the stanchion 42, foot 14, shelf 46, brass hangers 74, fittings 76, pins 78, and holes 79 for inserting the pins 78 to secure or hold the shelf in any number of positions around its rotation (360-degree capable). This is another unique optional functional feature of the Bedding Rack.

Figure 16:
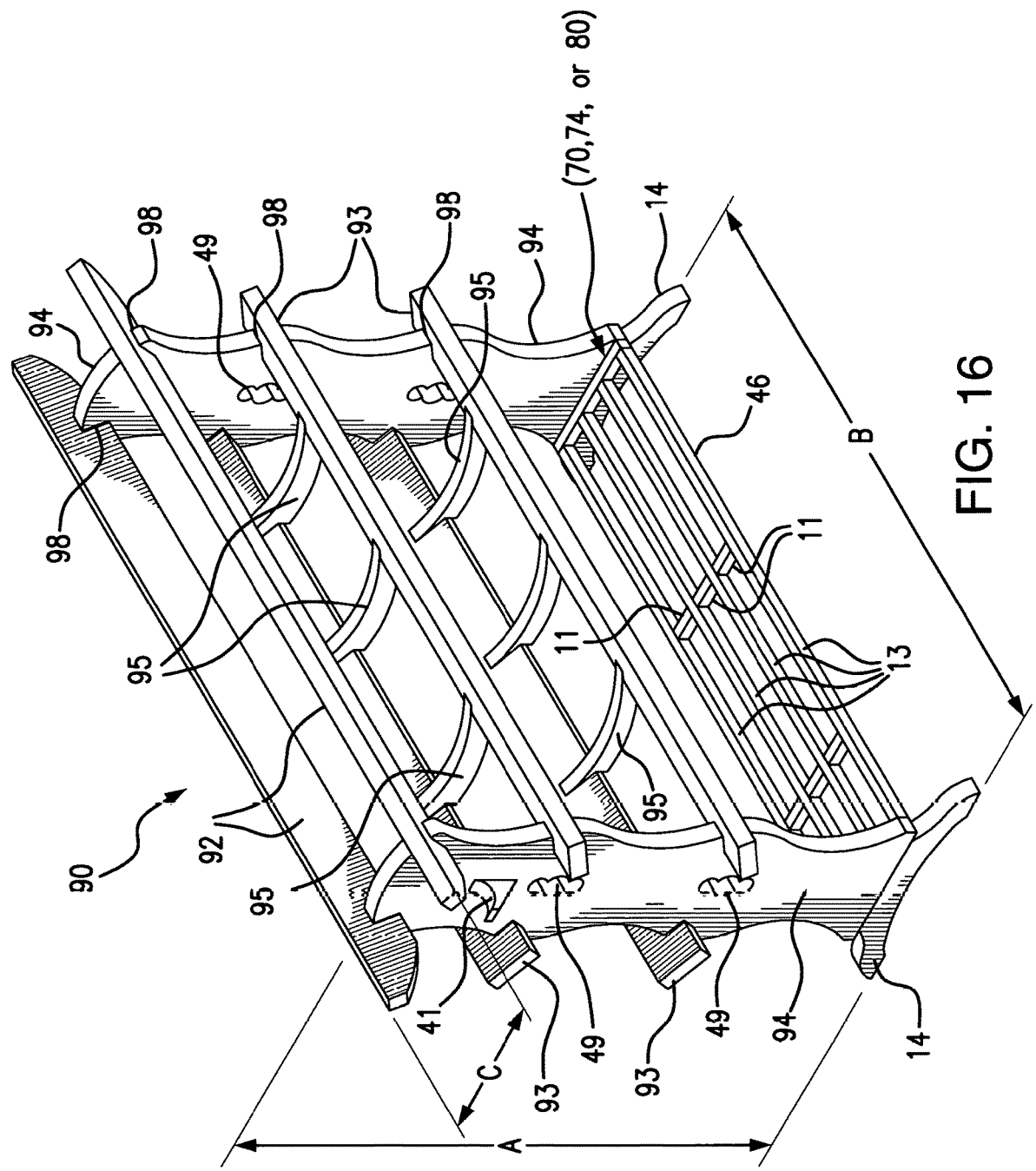
FIG. 16 shows a third alternative advanced structural design of a wooden Bedding Rack that has two extended top rails and shelf rails secured to the stanchions by lap joints.

FIG. 16 shows an alternative advanced structural design of a wooden Bedding Rack 90 comprising angled dual top rails 92 for draping the comforter, quilt, or duvet, dual angled shelf rails 93 for pillows and sham storage, decorative vertical stanchions 94, decorative cutouts 49 (veneers, panels, appliques, or carvings are other options), extended feet 14 to provide greater stability, a plurality of cross bars 95, a lower shelf 46 composed of orthogonal 11 and lengthwise shelf rungs 13, some means of securing the lower shelf in position 70, 74, or 80 (as shown in other Figures; not depicted in this figure), and lap joints 98 that interconnect each of the six rails to the stanchions 94. The use of 12 lap joints in this design embodiment provides significant stability to the Bedding Rack to support a comforter set, which is typically well below 20 pounds in weight (average is about 12 pounds). In addition, this design using lap joints is also easier to assemble for consumers than dovetail joints and more secure when assembled without glue. Stability is further improved when the metal cross bars shown in FIG. 18 are used relative to wood cross bars shown in FIG. 16. Approximate Dimensions are: A=44 inches, B=38 to 50 inches; top rails=55 inches, and C=10 inches.

Figure 17:
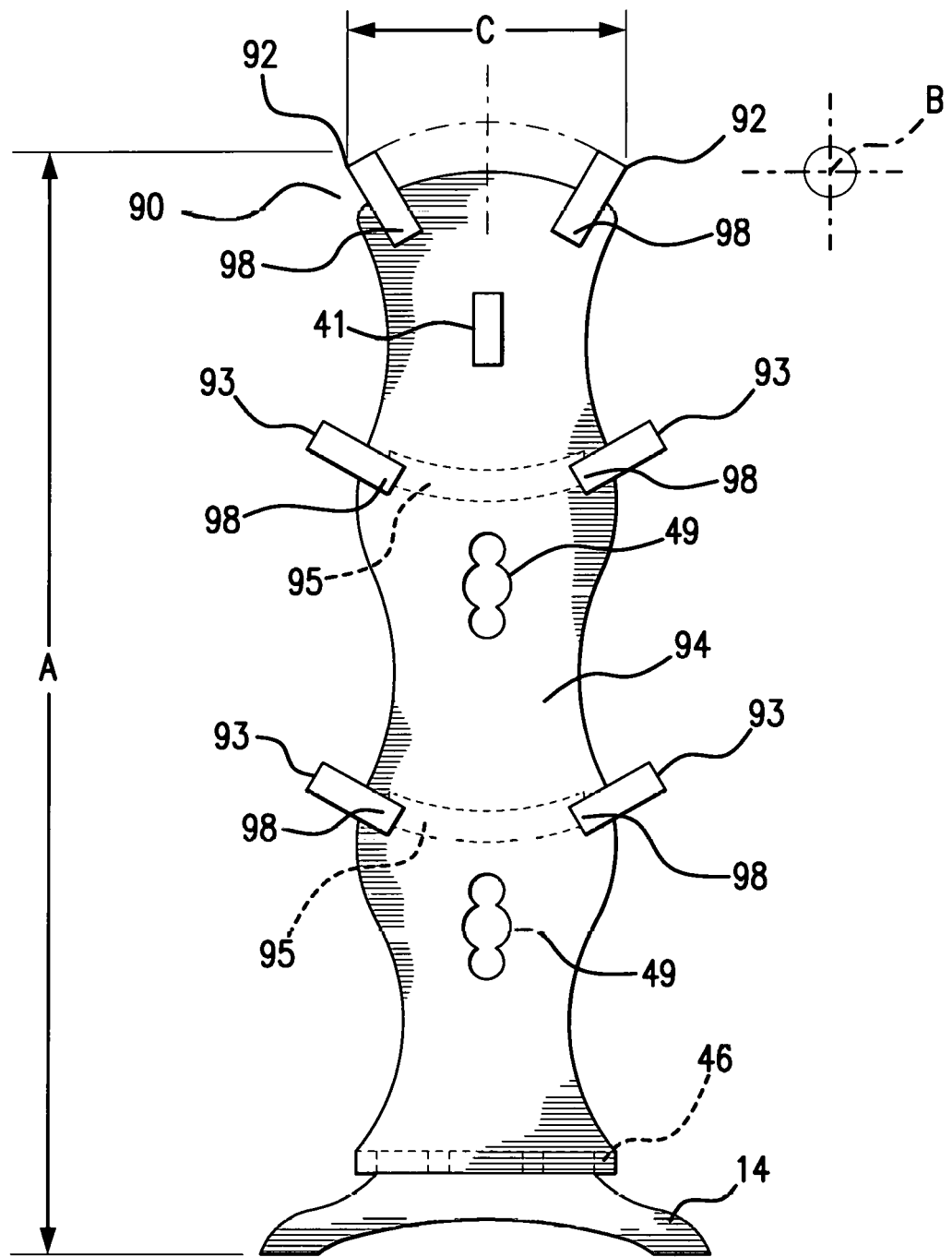
FIG. 17 shows a side view of the alternative Bedding Rack design shown in FIG. 16.

FIG. 17 shows a side end view of an alternative advanced structural design of a Bedding Rack 90 comprising angled dual top rails 92 at an angle of about 30 degrees to the vertical plane, dual side rails 94 at about 45-degree angles to the vertical plane, decorative vertical stanchions 96, decorative cutouts 49, extended length feet for stability 14, a lower shelf 46, cross bars 95, and lap joints 98. To properly store and display a Comforter Set with an industry standard bedspread of about 110×96 inches (folded to 96×55 inches), this embodiment would be about 44 inches for Dimension A (height), 55 inches for Dimension B (the length between the stanchions 94 plus the outside extended horns of the top rails 92), and about 10 inches for Dimension C (width), measured from the outside edges of the top rails 92. The distance or separation between the stanchions could be about 38 to 54 inches depending on the decorative design appearance and overall balance desired by the designer and manufacturer. Note that the height in this embodiment 90 is about four inches less than the height in the embodiments shown in FIG. 3 (10) and in FIG. 16 (90), which provides additional style options and features of the Bedding Rack for the benefit of consumer choice based on appearance and overall size. The functional features are still the same in each embodiment to include optional metal Bedding Rack designs that can incorporate one or two top rails as well. These dimensions ensure that an essential intent of the wood and metal Bedding Racks is achieved to where the properly draped bedspread (quilt, comforter, or duvet) will not touch the floor or droop off the top rail horn ends.

FIG. 18 shows an alternative design for Bedding Rack 90 using metallic cross bars 99 that are attached between the angled pillow and sham shelf rails 93. Each rail has three cross bar slots 97 to fit the ends of three metal cross bars 99. A tight fit of the metal cross bars into the slots on the rails adds structural stability and further secures the rails in place at the lap joints. This design is more effective than the wooden cross bars shown in FIGS. 16 & 17 but may not be as decorative based on consumer preference. The width of the metal rails will be about one inch with cross bar gauge thickness TBD. The type of metal to use is manifold, as wrought iron, aluminum, or a wide range of rigid to spring steel can be used and adapted to the Bedding Rack design. Note also that the slots 97 for the cross bars can each be up to about eight inches long so that the one-inch wide cross bars can be adjusted to best support pillows and shams.

FIG. 19 shows a detail of the alternative wood pillow and sham shelf rail 94 used for Bedding Rack 90 when metal cross bars 99 are used as shown in FIG. 18. Each rail has two lap joint cutouts 98 and three cross bar slots 97 to fit the cross bars 99 once the rails are attached to the stanchions at assembly. Length and width of the slots 97 for the cross bars are dependent on the metal material selected as the best option. Up to eight inches is mentioned in the previous figure legend, but that is an estimate. A minimum length of about one and one-quarter inch is required to fit a metal cross bar of about one-inch width.

FIG. 20 shows the detail of the carpentry Lap Joint used for the alternative wooden Bedding Rack 90 shown in FIG. 16. The top rail lap joints 92 are angled at 30 degrees from the vertical center line. The rails 92 and 93 have identical cutouts as the stanchion cutouts 98 for connecting the lap joint together to achieve a tight, stable and self-locking fit.

Figure 21:
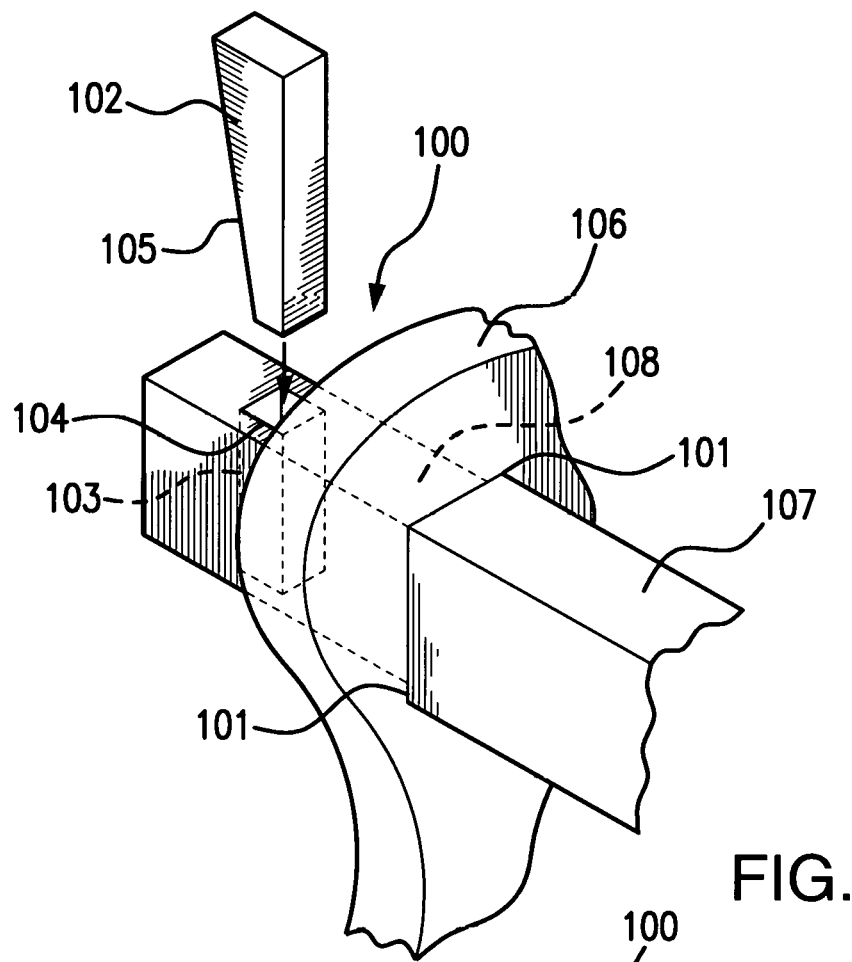
FIG. 21 shows a carpentry (wood) Wedge Joint used as an alternative method for attaching rails to the stanchions in wooden Bedding Racks.

FIG. 21 shows a carpentry Wedge Joint 100 that is comprised of a wedge slot 102 and a triangular tapered wooden wedge 104. Wedge or peg joints are not depicted in the three wood Bedding Rack embodiments shown in earlier figures, but the design can be easily adapted for a wooden Bedding Rack. Each wedge joint 100 would be used for pillow and sham shelf rails only 107. The rail would have an edge 101 on the inside of the stanchion 106 to secure the rail on that side. A smaller wood rail piece 108 would pass through the stanchion 106 as a tight fitting to the outside. On the outside of the stanchion 106, the wedge slot 104 would be cut straight down and through the rail on the outside. The opposite angled side would be tapered 103 to match the angle or taper 105 of the wedge 102. Once the rail is passed through the stanchion, the joint is secured by tapping the wedge 102 into the wedge slot 104 to form a tight and self-locking fit with the wedge 102 set flat against the outside of the stanchion 106. This design has a decorative appeal and traditional appearance that is useful as another optional method for connecting rails to stanchions.

Figure 22:
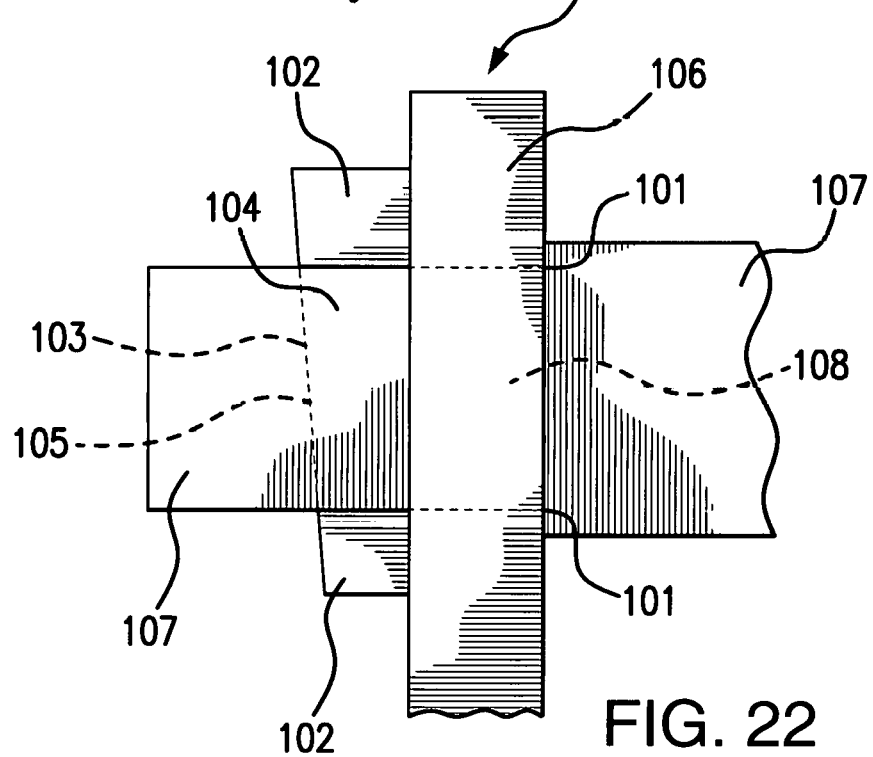
FIG. 22 shows a side view of a wedge joint in the secured or tightened position of a rail to a stanchion as shown in FIG. 21.

FIG. 22 shows a side view of a carpentry Wedge Joint 100 described in detail in FIG. 21. In this figure, the wedge 102 is tapped into the wedge slot 104 on the rail 107 where the angled or tapered edges 103 & 105 are flush with each other and the wedge 102 sits flat against the stanchion 106. The inside edge of the rail 101 establishes the stability of the joint with the self-locking wedge itself and by the tight fitting 108 with the stanchion 106.

Figure 23:
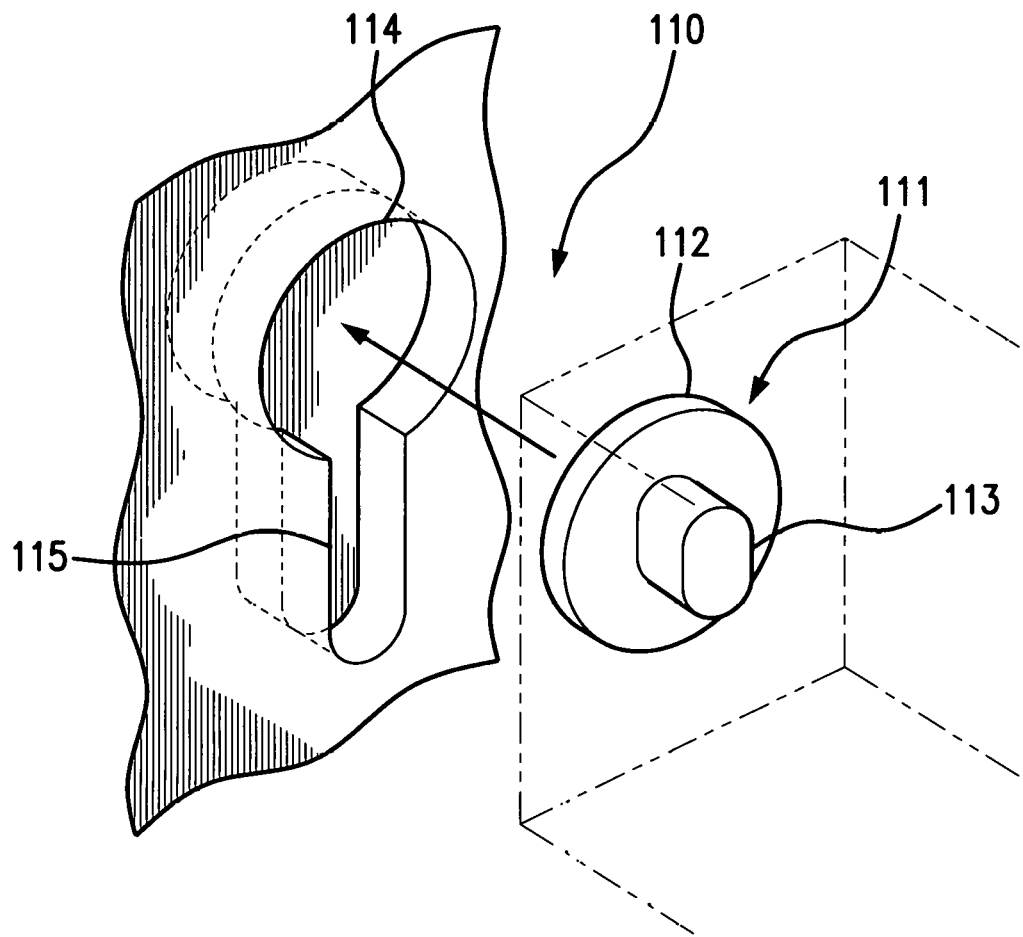
FIG. 23 shows an alternative metallic keyhole joint used to secure the rails to the stanchions in wooden Bedding Racks.

FIG. 23 shows a fourth alternative attaching method for connecting the rails to the stanchion in a wooden Bedding Rack. This Keyhole Joint 110 is composed of a male component 111 that has a round outside part 112 and an oval inside part 113 that fits into the female keyhole component 114 that has an inner slot 115 large enough to accommodate the male circular piece 112. When the male component is slid down into the lower keyhole slot 115, it self-locks the rail (male side) 111 into the stanchion (female side) 114 and prevents rotation by the tight fitting of the inside oval part 113 to the straight part of the female keyhole 115. This self-locking method is not shown in any of the Bedding Rack designs but is depicted here as an alternative method/ means since it is commonly used for assembling unassembled furniture components in other furniture pieces such as bed frames and shelf units. Additional common options using COTS nut and bolt fasteners and cam-lock latch systems such as those seen in some assembled furniture could also be used that would alter the price points for manufacturing and sales price to broaden the consumer market for the Bedding Rack.

SUMMARY OF THE INVENTION

The basic elements and fundamental purpose of the invention is to fill the need for a highly functional Bedding Rack for storage and display of King Size and Queen Size bedspreads such as quilts, comforters, and duvets with the following objectives:

The invention provides for at least four types of Bedding Rack apparatus in the form of wood or metallic constructions. The wood and metal Bedding Racks have variants that are permanently assembled and shipped when manufactured and both material variants have embodiments that can be assembled by the seller or buyer.

The invention provides for component parts of the Bedding Racks to be readily shipped in easy to handle shipping containers for later assembly.

The invention meets the need for storing and displaying King Size and Queen Size comforter sets with bedspreads such as quilts, comforters, and duvets by specifically sizing the Bedding Rack to readily accommodate such large-scale items.

The invention further provides integral storage and display of a plurality of pillows, shams, and smaller accent pillow comprising the comforter set when not on the beds themselves.

Further, the invention provides an integral lower storage area for accommodating bedroom slippers, stuffed toys/ animals and other bedroom paraphernalia when not in use.

Still further, the invention can incorporate casters or rollers to provide for an easy means of movement of the Bedding Rack.

In still a further feature of the instant invention, there are a plurality of attachment points or hooks on the vertical stanchions of the Bedding Rack apparatus that provide a means for hanging clothing and other bedroom accoutrements.

It will be noted that the instant invention provides for the Bedding Rack to be provided as a preassembled piece of furniture. In addition, It will be noted that the instant invention can be in the form of wood or metallic construction readily adapted by the user to the concept of "knockdown" rack or stand assembly inseparate components thereby facilitating product shipments in flattened individual assembly pieces in a compact package.

Specifically, utilizing the "knock-down" product concept an individual inventive concept 10 in FIG. 1 discloses component pieces preassembled when manufactured or that can be assembled by the user without using tools. For example, the spaced apart vertical stanchions 12 and supporting rails 16, and lower shelf 20 can be connected and secured by means of mechanical interlocking devices with slots and tabs projecting through the slots to ensure a compact and sound static structure is achieved capable of supporting a plurality of comforter set components and other sleep-related items. COTS nut with bolt inserts and cam-locks between the stanchions and rails can also be used for the assembly-type Bedding Rack.

In an alternative embodiment, the novel inventive Bedding Rack concept for storing and displaying a comforter set quilt, duvet, comforter, pillows, and shams is constructed using metallic materials 30 as shown in FIG. 2. The Figure discloses 30 the inventive concept in the form of a metallic construction, comprising vertical end stanchions 31, two sets of mirror image end pieces 32, vertical center pieces 33, horizontal top rail 34, mid-level shelf rails 35, a lower shelf 36, and hooks 37; and whereby the metallic materials include brass, bronze, copper, aluminum, titanium, annealed or spring steel, and metal oxide materials that are capable of being connected by soldering, or electric arc welding or equal processes.

In a further alternative embodiment 40 disclosed in FIG. 3 the Bedding Rack as first described has a single extended top rail 44 that the bedding comforter/quilt/duvet/bedspread would be placed about equally over and on either side of the top rail, stanchion end pieces 42 with supporting feet, a plurality of horizontal mid-level shelf rails 43 with cross bars 45 for storing pillows and shams, a lower preformed shelf 46, a means for the lower shelf to be raised with bench dog joints 70, dowels 80, or a metal hanger 74, and tight fitted self-locking T-bridle 50 and dovetail joints 48.

The inventive concept discloses a plurality of tight fitted and self-locking carpentry joints for wood Bedding Racks 10, 40, 90 in the following specifics:
1. FIG. 5, T-Bridle joint 50 between end stanchion 42, 92, and horizontal cross rails 44, 94, with cut out 52, and recess slots 54.
2. FIG. 6, Dove tail joint 60, with dove tail 62, and slot 64.
3. FIG. 7, Dove tail joint 60, with dove tail 62, and slot 64.
4. FIGS. 8-11, Sliding shelf 78, Bench Dog joint 70, block 72, dowel 74, and pin 76.
5. FIGS. 12-13, Base shelf 42, slide shelf 78, end stanchion 42, 92, with dowel 75, and slot 77.
6. FIG. 14, Keyhole type joint 112, connecting end stanchions 42, 92, to horizontal rails 44, 94.
7. FIGS. 15-16, showing means with elevating swivel means 74. 76, for raising and lowering lower shelf elements 46 by foot actuation by user.
8. FIGS. 19-21, showing a carpentry joint 110 between an end stanchion 94 and rail 92 comprising a wood taper wedge 112, square opening 114 in rail. 92 and shoulder 116 on rail 92.
9. FIGS. 22-23 show side views of a carpentry joint 120 between end stanchion 92 and side rail 94 with circular shaped actuating metallic connector 122, with connecting circular slots 124 in horizontal rails 94.
10. Finally, mortise and tenon joints are used to connect a foot to a stanchion. This joint connection is preformed and not depicted in the Figures.

The inventive concept in a further embodiment in FIG. 2 discloses 30 the inventive concept in the form of a metallic construction, comprising vertical end stanchions 31, two sets of mirror image end pieces 32, a center piece 33, hooks 37, extended horizontal top rail(s) 34, mid-level pillow and sham rails 35, and a lower shelf made of preformed rungs 36.

In the metallic inventive concept embodiment 30, the metallic components are capable of being joined by electric arc, atomic hydrogen or other comparable welding methods. In addition, the metallic components can also be connected by means of soldering, gluing using epoxy products, and by COTS fasteners.

The embodiments of the wood Bedding Rack shows an apparatus that has vertical stanchions that are at least 48 inches in height. Since the standard comforter for a King- or Queen-sized bed is about 110×96 inches, when the comforter is folded, it will produce a doubled layer of comforter with dimensions of 96×55 inches. In the new variant, there are two top rails set apart by about 10 inches, which allows the vertical stanchions to be a minimum of 44 inches. For the single or dual top rail configurations, the overall length of the top rails must be about 55 inches to ensure a standard large-sized bedspread does not droop off the top ends or touch the floor when draped over the rack.

In a further variant, there will be two top rails across the top parallel and at the same height as each other, which reduces the height of the rack from 48 to 44 inches (approximately 10-11 inches apart). The height and style differences here are useful as options, although the functional features are still the same.

Further the wood apparatus 10 has two sets of mid-level shelf rails that are set about 10-11 inches apart, but then there is a third parallel rail in the middle but placed about 1.0-1.5 inches below the line that could be drawn from the one rail to the other above it. The other rail shelf will be the same as the rail shelf above it as described here. This variant uses the single extended rail across the top so the overall height must be about 48 inches. In the alternative concept where there are two top rails set about 10 inches apart 90, the stanchion height can be about 44 inches. In both instances, a standard size bedspread of 96×55 inches will fit well when draped over the Bedding Rack. This flexibility in dimensions is applicable for metal and wood variants and for preassembled and easily assembled Bedding Racks.

In a still further embodiment there will be two new sets of wood variants where the cross bars are made so that they pass through the vertical side pieces of the rack and protrude out far enough on the outside of the rack that a slot can be exposed and a wedge placed inside the slot to secure the rail to the stanchion. In this variant, the rails will have the same arrangement so that each rail will be assembled through the vertical sides. By creating this variant, a bedding rack can be produced that is completely unassembled. This will save space for shipping and allow the user to complete assembly by a simple procedure. The use of wedges on the outside to secure the rails will also create a rustic appearance.

In addition it should be noted that the first Bedding Rack as disclosed is designed so that each wood element of the apparatus is glued together so that the product is sold as completely finished. Therefore, this embodiment that can be assembled with wedges/pegs/dowels will take up less space and can be packaged more efficiently.

In yet a further design embodiment focuses on the manner of assembly and a feature employing male/female keyhole connectors used to attach each rail to the vertical stanchions. Specifically, on the vertical side pieces, a metal male part will be installed. This part will have a circular end piece that fits into the female part. The female part will be installed on the end of each rail.

It can be noted that the user will slot the circular male end into the keyhole at the top of the female part so that the male part can then be slid down into the female part along a rectangular opening that will secure the cross bar to the vertical side piece. This is a common attachment strategy and other similar strategies could be used to secure the rails to the vertical stanchions. Here, we simply describe a more common type fastener, but others could be used to accomplish the same effect.

In yet another alternative embodiment, the novel inventive concept for the Bedding Rack is construction using plastic, fiberglass, reinforced glass plastic (RGP) and other similar non-metallic materials.

In addition, the design embodiments for assembled and non-assembled variants can vary to complement the manifold types and styles of furnishings recognized in the industry, as well as styles/models identified by specific manufacturers. Examples include Victorian, Empire, Mission, Art Deco and many more. The type of wood used may also vary to incorporate and complement a furniture style such as cherry, oak, walnut, mahogany, maple, and pine. Hence, the user will be able to select from numerous furniture styles, wood types, and finishes.

Turning now to the metal version of the bedding rack, once again there will be fully assembled variants and the knock-down variants that allow assembly by the seller or buyer. In addition, the buyer will be able to select from a wide variety of colors/finishes of the metal rack, as well as different textures that can be achieved from powder coating and tailored paint techniques.

The total inventive disclosed herein is novel and improved compared to existing prior art embodying the following unique features:

Novelty of combination of self-locking tight fitted wood joints without requiring gluing or fasteners for the three (3) wood Bedding Racks disclosed herein.

Novelty of a design of Bedding Rack employing metallic or materials such as fiber glass, and other equal non-metallic material components.

Novelty of designs of Bedding Racks readily capable of being shipped in flat boxes, containers, and being capable of being assembled using a range of attachments in the form of pins and dowels, fasteners in the form of screws, bolts, self tapping screws, and gluing using conventional glues and epoxy gluing means.

Novelty of transporting and shipping of all the four (4) Bedding Rack designs disclosed herein in flat and easy handle cardboard, plastic, fiber glass boxes and equal low-cost materials.

Novelty of four distinct designs of Bedding Racks with a specific range of dimensions that facilitate functional storage and display for the complete range of large-size comforter sets that greatly enhance storage and display of bedroom paraphernalia, Novelty of four designs of Bedding Racks providing for total storage and display system that are functional and decorative and ensure that the stored items are above the room floor level and thereby precluding soiling by materials on carpeted or wooden floors.

Novelty arrangement for four (4) separate Bedding Rack designs incorporating a range of supporting elements, cross bars, rails, shelves, and hook attachments that facilitate storage and display of the complete range of bedroom paraphernalia, Novelty means of transporting, assembling and constructing four (4) designs of Bedding Racks that are easy, secure and cost effective.

Novelty means for elevating the lower shelf by using dowels, bench dog joints, and metal hangers, Novelty for providing easy maneuverability of range of Bedding Racks using rollers or casters, and other equal means providing mobility for moving Bedding Racks around bedroom.

In summary, for wood Bedding Racks there will be two versions: one with a single cross bar along top and the other with a double cross bar along the top. There will be assembled and unassembled versions where two or more means will be used to assemble the unassembled variants; by using wedges/pegs/dowels placed into the slots on the rails and stanchions to include the metal male/female keyhole latch strategy. Finally, the wood Bedding Racks will be produced in several common furniture styles in conjunction with wood type and finish.

It will further be understood from the foregoing description that various modifications and changes can be incorporated based on the specification description and the accompanying drawings are intended for the purposes of illustration only and should not be construed in a limiting sense.

I claim:

1. A Bedding Rack framework for use in a bedroom location for the storage and display of bedspreads, quilts, comforters, duvets, and pillows and shams with controlling overall dimensions of A height, B width, and C depth providing the capability to preclude stored bedding components from drooping and coming into contact with a bedroom floor, comprising:
   a) two vertical stanchion end pieces, one or more bad bearing upper horizontal rail members, a plurality of mid-level horizontal supporting shelf rail members, a preformed bottom storage shelf and two stabilizing support feet members, and hooks,
   b) wherein the preformed bottom storage shelf comprises longitudinal rungs and orthogonal end rungs at each end and the components of the preformed bottom storage shelf are connected by either carpentry Lap Joints, or Wedge Joints, or Dovetail Joints or T-Bridle Joints, and,
   c) wherein the two vertical stanchions are connected to the upper horizontal rail members and the plurality of horizontal supporting shelf rail members by either carpentry Lap Joints, or, Wedge Joints, or Dovetail Joints or T-Bridle Joints, and,
   d) wherein the preformed bottom storage shelf is attached to the two vertical stanchion ends by carpentry Bench Dog Joints, and,
   e) wherein in the two stabilizing support feet members are attached to the two vertical stanchion ends, by carpentry Mortice and Tenon joints.

2. The apparatus of claim 1 where the controlling overall dimensions for A is equal to not less than 48 inches; B is equal to not less than 55 inches and C equal to not less than 10 inches.

3. The apparatus of claim 1 wherein the components of the rack can be assembled without the need for hand tools.

4. The apparatus of claim 1 wherein the wood is hardwood.

5. The apparatus of claim 1 wherein the preformed bottom storage shelf is capable of vertical movement.

6. A Bedding Rack wood framework apparatus for use in a bedroom location for the storage and display of bedspreads, quilts, comforters, duvets, and pillows and shams with controlling overall dimensions of A height, B width, and C depth providing the capability to preclude stored bedding components from drooping and coming into contact with a bedroom floor, comprising:
- a) two vertical stanchion end pieces, one or more load bearing upper horizontal rail members overhanging the vertical stanchion and disposed at an acute angle with respect to the vertical centerline of the rack end pieces, a plurality of horizontal supporting shelf rail members angled at an acute angle with respect to the vertical centerline of the apparatus, hooks, a composite preformed bottom storage shelf and two stabilizing support feet members and,
- b) wherein at least one of the rails and orthogonal cross bars are connected by either carpentry Lap Joints, or Wedge Joints, or Dovetail Joints, or T-Bridle Joints, and,
- c) wherein the two vertical stanchions are connected to the upper horizontal rail members and the plurality of horizontal supporting shelf rail members by either carpentry Lap Joints, or, Wedge Joints, or Dovetail Joints or T-Bridle Joints, and,
- d) wherein the composite preformed bottom storage shelf is attached to the two vertical stanchion ends by carpentry Bench Dog joints, and,
- e) wherein in the two stabilizing support feet members are attached to the two vertical stanchion ends by carpentry Mortice and Tenon Joints, and
- f) wherein the preformed bottom storage shelf is capable of vertical movement, and
- g) wherein all the component parts are shippable as separate pieces in a box or container.

7. The apparatus of claim 6 where the controlling overall dimensions for A is equal to not less than 44 inches; B is equal to not less than 55 inches and C equal to not less than 10 inches.

8. The apparatus of claim 6 wherein the wood is hardwood.

9. The apparatus of claim 6 wherein the plurality of horizontal supporting shelf rail members overhang the vertical end pieces.

10. The apparatus of claim 6 wherein the orthogonal cross bars on the horizontal supporting shelf rails are capable of movement.

11. The apparatus of claim 6 wherein the horizontal supporting shelf rails are connected together by a metallic cross bar that is attached to the horizontal supporting shelf rails by angled portions of the metallic cross bar entering holes in the horizontal supporting shelf rails.

12. The apparatus of claim 6 wherein the load bearing upper horizontal rails are fitted to the vertical end stanchions at each end.

* * * * *